(12) United States Patent
Seier et al.

(10) Patent No.: US 8,891,661 B2
(45) Date of Patent: Nov. 18, 2014

(54) TECHNIQUES FOR DATA TRANSMISSION USING HIGH-ORDER MODULATION

(75) Inventors: Udo Seier, Marbach (DE); Khaled Fazel, Auenwald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 690 days.

(21) Appl. No.: 13/126,011

(22) PCT Filed: Oct. 27, 2008

(86) PCT No.: PCT/EP2008/064545
§ 371 (c)(1),
(2), (4) Date: Jul. 14, 2011

(87) PCT Pub. No.: WO2010/048984
PCT Pub. Date: May 6, 2010

(65) Prior Publication Data
US 2011/0261904 A1      Oct. 27, 2011

(51) Int. Cl.
*H03K 7/10* (2006.01)
*H04L 27/22* (2006.01)

(52) U.S. Cl.
USPC .......................................... 375/269; 375/332

(58) Field of Classification Search
USPC ......... 375/259, 260, 261, 264, 271, 279, 280, 375/281, 295, 298, 300, 302, 308, 316, 320, 375/322, 329, 332, 269
See application file for complete search history.

(56) References Cited

U.S. PATENT DOCUMENTS

| | | | | |
|---|---|---|---|---|
| 5,970,098 | A | * | 10/1999 | Herzberg ........................ 375/264 |
| 7,522,072 | B1 | * | 4/2009 | Wu ................................. 341/50 |
| 2003/0067991 | A1 | | 4/2003 | Okamoto | |

OTHER PUBLICATIONS

Penicaud, M, et al. "Iterative Decoding of Rate Adaptive Multilevel Coded Modulation for Mobile Satellite Communication." IEEE Global Telecommunications Conference (GLOBECOM '96), London, UK, vol. 1, Nov. 18-22, 1996.

Zhou, L. et al. "Investigation of Multilevel Coded Modulation in the Application of the Adaptive OFDM System." International Conference on Microwave and Millimeter Wave Technology (ICMMT 2008), IEEE, Piscataway, NJ, USA, Apr. 21, 2008.

Ardakani, M. et al. "Near-Capacity Coding in Multicarrier Modulation Systems." IEEE Transactions on Communications, vol. 52, No. 11, Nov. 2004.

* cited by examiner

*Primary Examiner* — Vineeta Panwalkar
(74) *Attorney, Agent, or Firm* — Coats & Bennett, PLLC

(57) ABSTRACT

Techniques for data transmission using high-order modulation are provided. According to one aspect, parameters of a transmission link are determined, and a multilevel coding scheme and a high-order modulation signal constellation are selected on the basis of the determined parameters. An information indicating the selected multilevel coding scheme and high-order modulation signal constellation and data symbols encoded according to the selected multilevel coding scheme and high-order modulation signal constellation are transmitted. In other aspects, QPSK data symbols are embedded between M-QAM data symbols or M-PSK data symbols with M>4. The QPSK data symbols may be used to improve the efficiency of the decoding process.

19 Claims, 13 Drawing Sheets

| LENGTH OF PAYLOAD SECTION | MODULATION | CODE RATE | | | | UNCODED DATA BITS PER PAYLOAD SECTION | CODED TRANSMISSION BITS PER PAYLOAD SECTION |
|---|---|---|---|---|---|---|---|
| | | LSB | LSB+1 | LSB+2 | MSBs | | |
| 24 symbols | 128-QAM | 3/4 | 11/12 | 23/24 | 1/1 | 159 | 168 |
| 18 symbols | 16-QAM | 5/6 | 8/9 | 1/1 | 1/1 | 67 | 72 |

FIG. 9

TECHNIQUES FOR DATA TRANSMISSION USING HIGH-ORDER MODULATION

TECHNICAL FIELD

The present invention relates to techniques for data transmission on a high-order modulation transmission link using multilevel coding.

BACKGROUND

When transmitting data on a high-order modulation transmission link, e.g. an M-QAM or M-PSK transmission link (M-QAM: M-level Quadrature Amplitude Modulation; M-PSK: M-level Phase Shift Keying), it is a known technique to use multilevel coding in order to protect the transmitted data with respect to imperfections of the transmission link or transmission equipment. In a multilevel coding scheme, an individual component code is provided for each bit of the data symbols. As the component codes can be individually selected, a good tradeoff between robustness of the data transmission and efficient use of the capacity of the transmission link can be achieved. That is to say, the multilevel coding scheme may be tailored to the requirements of the intended application by suitably selecting the individual component codes.

However, even when using multilevel coding, certain types of disturbances such as strong variations in the characteristics of the transmission channel during an ongoing transmission or phase jitter may adversely affect the transmission performance.

Accordingly, there exists a need to provide improved techniques for data transmission on a high-order modulation transmission link.

SUMMARY

According to an embodiment of the invention, a method of transmitting data on a high-order modulation transmission link is provided. According to the method, a multilevel coding scheme and a high-order modulation signal constellation for encoding data symbols is selected on the basis of parameters of the transmission link.

The multilevel coding scheme provides a respective component code for each bit of the data symbols. At least two of the component codes are different from each other. For example, the component codes may be a convolutional code or a block code. Further, a component code may also correspond to leaving the data unchanged.

The high-order modulation signal constellation may be an M-QAM signal constellation with M≥4, an M-PSK signal constellation with M≥4 or any other signal constellation in which a single data symbol corresponds to at least two bits.

According to the method, a payload section with data symbols encoded according to the selected multilevel coding scheme and high-level modulation signal constellation is transmitted. Further, control information with respect to the selected multilevel coding scheme and high-order modulation signal constellation is transmitted. For example, the control information may be transmitted in a header section of a transmission frame. When receiving the transmitted payload section, it is thus possible to select a multilevel coding scheme and a high-order modulation signal constellation for decoding received data symbols on the basis of the transmitted control information. This in turn allows to adapt the multilevel coding scheme and the high-order signal constellation to the parameters of the transmission link and to thereby take into account varying conditions of the transmission link.

According to a further embodiment of the invention, a method of transmitting data on a high-order modulation transmission link is provided. The method comprises transmitting first data symbols encoded according to a multilevel coding scheme and an M-QAM or M-PSK signal constellation with M>4.

The multilevel coding scheme provides a respective component code for each bit of the first data symbols, at least two of the component codes being different from each other. For example, the component code may be a convolutional code or a block code. Further, the component code may correspond to leaving the data unchanged.

The method further comprises transmitting QPSK data symbols (QPSK: Quadrature Phase Shift Keying) encoded according to the multilevel coding scheme and a QPSK signal constellation. For encoding the QPSK data symbols according to the multilevel coding scheme and the QPSK signal constellation, bits of the QPSK data symbols are assigned to corresponding bits of the first data symbols. The QPSK data symbols are embedded between the first data symbols at predefined positions, thereby forming bit sequences including the bits of the QPSK data symbols interposed between the corresponding bits of the first data symbols. The bit sequences including the bits of the QSPK data symbols are encoded by the component codes of the corresponding bits of the first data symbols.

By means of the embedded QPSK data symbols receiver synchronization may be eased, e.g. the embedded QPSK data symbols may be used for phase jitter compensation of a recovered carrier signal, thereby improving the robustness of data transmission with respect to disturbances. Further, the decoding process may be improved by taking advantage of the high reliability of the QPSK data symbols. At the same time, encoding and decoding of the data symbols is possible without providing a separate encoder and decoder for the QPSK data symbols, thereby providing a high efficiency.

According to a further embodiment, a communication equipment for sending data on a high-order modulation transmission link is provided. The communication equipment comprises a control device configured to select, on the basis of parameters of the transmission link, a multilevel coding scheme and a high-order modulation signal constellation for encoding data symbols.

The multilevel coding scheme provides a respective component code for each bit of the data symbols. At least two of the component codes are different from each other. For example, the component codes may be a convolutional code or a block code. Further, a component code may also correspond to leaving the data unchanged.

The high-order modulation signal constellation may be an M-QAM signal constellation with M≥4, an M-PSK signal constellation with M≥4 (M-PSK: M-level Phase Shift Keying) or any other signal constellation in which a single data symbol corresponds to at least two bits.

The communication equipment further comprises a first transmitter function. The first transmitter function is configured to transmit control information with respect to the selected multilevel coding scheme and high-order modulation signal constellation. In addition, the communication equipment comprises an adaptable multilevel encoder configured to encode data symbols according to the selected multilevel coding scheme and high-order modulation signal constellation, and a second transmitter function configured to transmit a payload section including the encoded data symbols. The first transmitter function and the second transmitter function may be formed in a single transmitter or may be implemented in separate transmitters.

According to a further embodiment of the invention, a communication equipment for receiving data from a high-order modulation transmission link is provided. The communication equipment comprises a first receiver function. The first receiver function is configured to receive control information with respect to a multilevel coding scheme and high-order modulation signal constellation for encoding data symbols.

The multilevel coding scheme provides a respective component code for each bit of the data symbols. At least two of the component codes are different from each other. For example, the component codes may be a convolutional code or a block code. Further, a component code may also correspond to leaving the data unchanged.

The high-order modulation signal constellation may be an M-QAM signal constellation with M≥4, an M-PSK signal constellation with M≥4 or any other signal constellation in which a single data symbol corresponds to at least two bits.

Further, the communication equipment comprises a second receiver function configured to receive a payload section including data symbols encoded according to the multilevel coding scheme and high-order modulation signal constellation, and an adaptable multilevel decoder configured to decode data symbols of the payload section according to the multilevel coding scheme and the high-order modulation signal constellation as defined in the control information received by the first receiver function. The first receiver function and the second receiver function may be formed in a single receiver or may be implemented in separate receivers.

According to a further embodiment, a communication equipment for sending data on a high-order modulation transmission link is provided. The communication equipment comprises a multilevel encoder for encoding data symbols and a transmitter configured to transmit the encoded data symbols. The multilevel encoder is configured to encode first data symbols according to a multilevel coding scheme and an M-QAM or M-PSK signal constellation with M>4.

The multilevel coding scheme provides a respective component code for each bit of the first data symbols, at least two of the component codes being different from each other. For example, the component code may be a convolutional code or a block code. Further, the component code may correspond to leaving the data unchanged.

Further, the multilevel encoder is configured to encode QPSK data symbols according to the multilevel coding scheme and a QPSK signal constellation. For this purpose, the bits of the QPSK data symbols are assigned to corresponding bits of the first data symbols. The QPSK data symbols are embedded between the first data symbols at predefined positions, thereby forming bit sequences including the bits of the QPSK data symbols interposed between the corresponding bits of the first data symbols. The multilevel encoder comprises a respective component encoder for each of the component codes. The bit sequences including the bits of the QPSK data symbols are encoded by the component encoders of the corresponding bits of the first data symbols.

According to a further embodiment, a communication equipment for receiving data from a high-order modulation transmission link is provided. The communication equipment comprises a receiver configured to receive data symbols and a multilevel decoder for decoding the received data symbols. The multilevel decoder is configured to decode first data symbols encoded according to a multilevel coding scheme and an M-QAM or M-PSK signal constellation with M>4.

The multilevel coding scheme provides a respective component code for each bit of the first data symbols, at least two of the component codes being different from each other. For example, the component code may be a convolutional code or a block code. Further, the component code may correspond to leaving the data unchanged.

Further, the multilevel decoder is configured to decode QPSK data symbols encoded according to the multilevel coding scheme and a QPSK signal constellation. For this purpose, bits of the QPSK data symbols are assigned to corresponding bits of the first data symbols. The QPSK data symbols are embedded between the first data symbols at predefined positions, thereby forming bit sequences including the bits of the QPSK data symbols interposed between the corresponding bits of the first data symbols. The multilevel decoder comprises a respective component decoder for each of the component codes. Bit sequences including the bits of the QPSK data symbols are decoded by the component decoders of the corresponding bits of the M-QAM data symbols.

BRIEF DESCRIPTION OF THE DRAWINGS

FIG. 9 shows a table with parameters relating to the exemplary structures of payload sections of FIG. 8.

Figure 1:
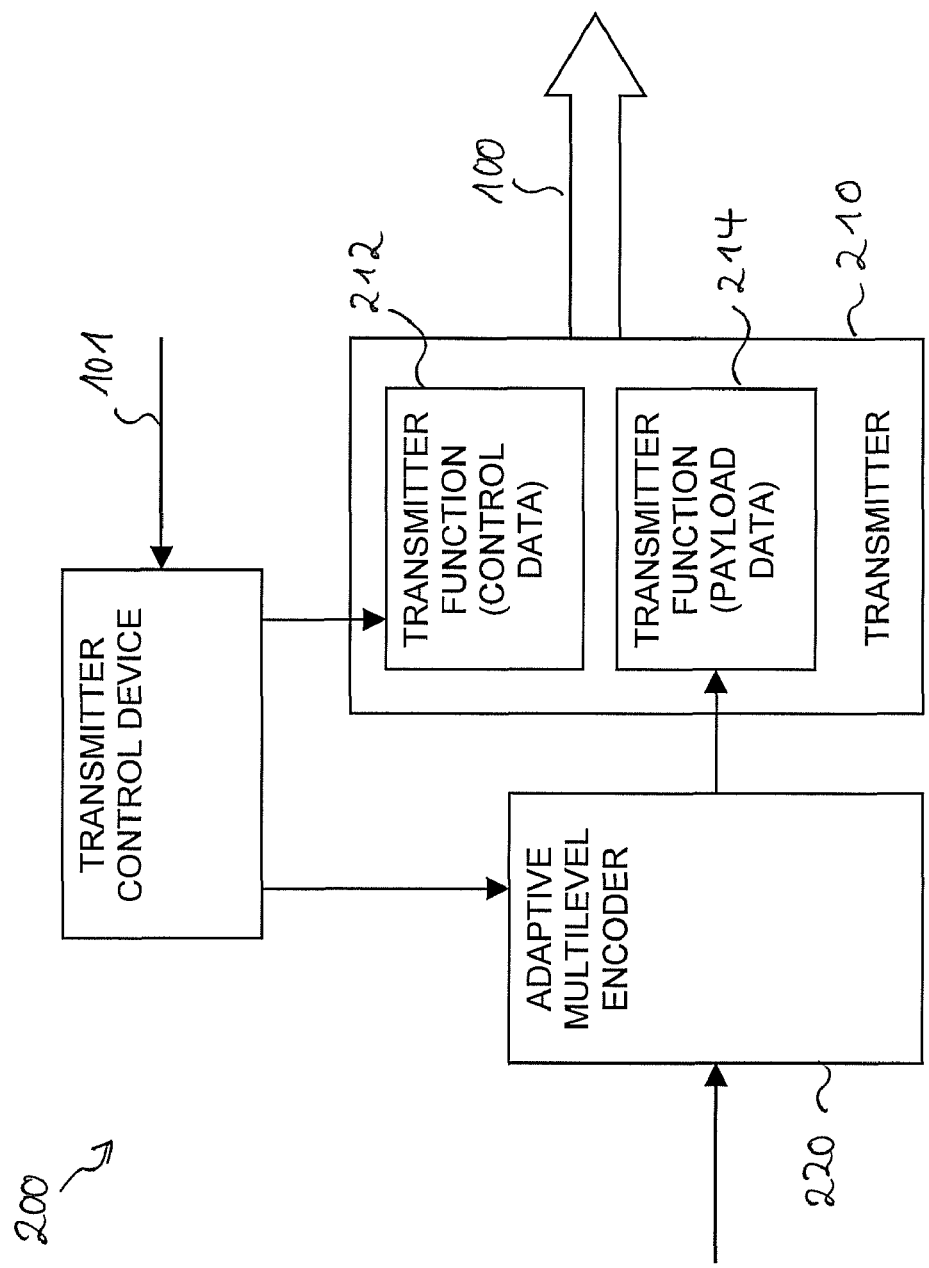
FIG. 1 schematically illustrates a communication equipment according to an embodiment of the invention, the communication equipment being configured for sending data on a high-order modulation transmission link.

In the following, the invention will be explained in more detail by referring to the drawings and specific embodiments which relate to communication methods and communication equipments for transmitting data on a high-order modulation transmission link. Throughout the drawings, similar components are designated by the same reference signs. For example, the communication methods and communication equipments according to the embodiments as described below may be used in wireless backhauling applications. The transmission link may thus be a radio link. In other embodiments, other types of transmission links are possible, e.g. wired transmission links. In this respect, a high-order modulation is considered to be a modulation providing a signal constellation in which a single data symbol corresponds to at least two bits. The signal positions may be signal levels or positions in a two-dimensional amplitude-phase space. In the following embodiments, the high-order modulation will be M-QAM. However, it is to be understood that in other embodiments other types of high-order modulation could be used, e.g. M-PSK. The number M of levels will typically be M=4 or larger.

The embodiments as described in the following are each based on the use of multilevel coding schemes. The multilevel coding schemes provide a respective component code for each bit of the data symbols. For example, a component code may be a convolutional code or a parity check code. In addition, other codes, e.g. simple block codes, turbo codes or low-density parity check codes may be used. Moreover, a component code may also correspond to leaving the data bits unchanged. However, also in the latter case the multilevel coding scheme provides for mapping or demapping of the otherwise uncoded bits with respect to positions of the signal constellation.

FIG. 1 schematically illustrates a communication equipment 200 according to an embodiment of the invention. The communication equipment 200 is configured for sending data on a M-QAM transmission link 100. Again, it is to be understood that other types of high order modulation can be used as well, e.g. a M-PSK transmission link. The communication equipment 200 comprises an adaptive multilevel encoder 220, a transmitter 210 coupled to send a transmission signal on the transmission link 100, and a transmitter control device 230.

The transmitter 210 comprises a first transmitter function 212 for transmitting control data and a second transmitter function 214 for transmitting payload data.

The transmitter control device 230 receives a quality signal 101 indicating the quality of the transmission link 100. For example, the quality signal 101 may be supplied via a back channel from a receiver coupled to receive the payload data from the transmission link 100. The quality signal 101 includes information relating to parameters of the transmission link 100. In particular, the quality signal 101 may indicate parameters related to the quality of the transmission link 100, such as signal-to-noise ratio, transmission-fault rates, jitter, or the like. If the communication equipment 200 is provided with a transceiver function, i.e. includes both a transmitter and a receiver for bi-directional transmission of data, the input signal 101 may be transmitted via the bi-directional transmission link from the receiver back to the transmitter. The control device 230 is configured to evaluate the quality signal 101 and to select a multilevel coding scheme and a M-QAM signal constellation for encoding data symbols on the basis of the evaluation. According to an embodiment, M-QAM signal constellations with M≥4 may be selected. Typically, the smallest M-QAM signal constellation will be a 16-QAM signal constellation. The largest M-QAM signal constellation may be a 128-QAM signal constellation or even larger M-QAM signal constellation.

In addition to the M-QAM signal constellation, a multilevel coding scheme is selected. On the one hand, the selection of the multilevel coding scheme depends on the selected M-QAM signal constellation. As larger M-QAM signal constellations have data symbols with a larger number of bits, the multilevel coding scheme will need to provide a correspondingly larger number of component codes. Further, the selection of the multilevel coding scheme may also itself depend on the determined parameters of the transmission link 100 as indicated by the quality signal. For example, if the quality signal 101 indicates a low quality of the transmission link 100, a small M-QAM signal constellation such as a 16-QAM signal constellation and a multilevel coding scheme providing four component codes may be selected. In addition or independently, the multilevel coding scheme may be selected to provide a higher degree of redundancy, thereby improving the robustness of the data transmission, e.g. by using component codes with smaller code rates. On the other hand, if the quality signal 101 indicates a high quality of the transmission link 100, a large M-QAM signal constellation, e.g. a 128-QAM signal constellation, may be selected. In addition or independently, a multilevel coding scheme may be selected which provides a small redundancy, thereby allowing for an efficient usage of the capacity of the transmission link 100, e.g. by using component codes with high code rates. Typically, not all component codes need to be adapted. In some cases, it may be sufficient to adapt the code rate of only one component code.

Data symbols to be transmitted are supplied to the multilevel encoder 220. The multilevel encoder 220 is configured to encode the data symbols according to the selected multilevel coding scheme and M-QAM signal constellation. For this purpose, a control signal indicating the selected multilevel coding scheme and M-QAM signal constellation is supplied from the transmitter control device 230 to the multilevel encoder 220. The encoded data symbols are supplied from the multilevel encoder 220 to the transmitter 210.

The control signal, indicating the selected multilevel coding scheme and M-QAM signal constellation, is supplied from the control device 230 to the transmitter 210 and received in the first transmitter function 212. The first transmitter function 212 is configured to transmit control data including control information with respect to the selected multilevel coding scheme and M-QAM signal constellation on the transmission link 100. For example, the control information may be transmitted in a header section of a transmission frame. Alternatively, another section of a transmission frame, a separate control frame, or a sideband channel may be used for transmitting the control information. In this respect, it is to be noted that the control information transmitted with the control data may pertain to a specific payload section. For example, the information may be transmitted in a header section of a transmission frame and may pertain to the payload section of the same transmission frame. In other examples, the control information may pertain to one or more payload sections transmitted in later transmission frames. For example, the control information may be transmitted in a header section of a transmission frame or in a separate control frame and may pertain to all payload sections transmitted in the future until new control information is transmitted with the control data.

The second transmitter function 214 receives the encoded data symbols from the multilevel encoder 220 and transmits them as payload data on the transmission link 100. In the illustrated embodiment, the encoded data symbols are transmitted in a payload section of a transmission frame.

Figure 2:
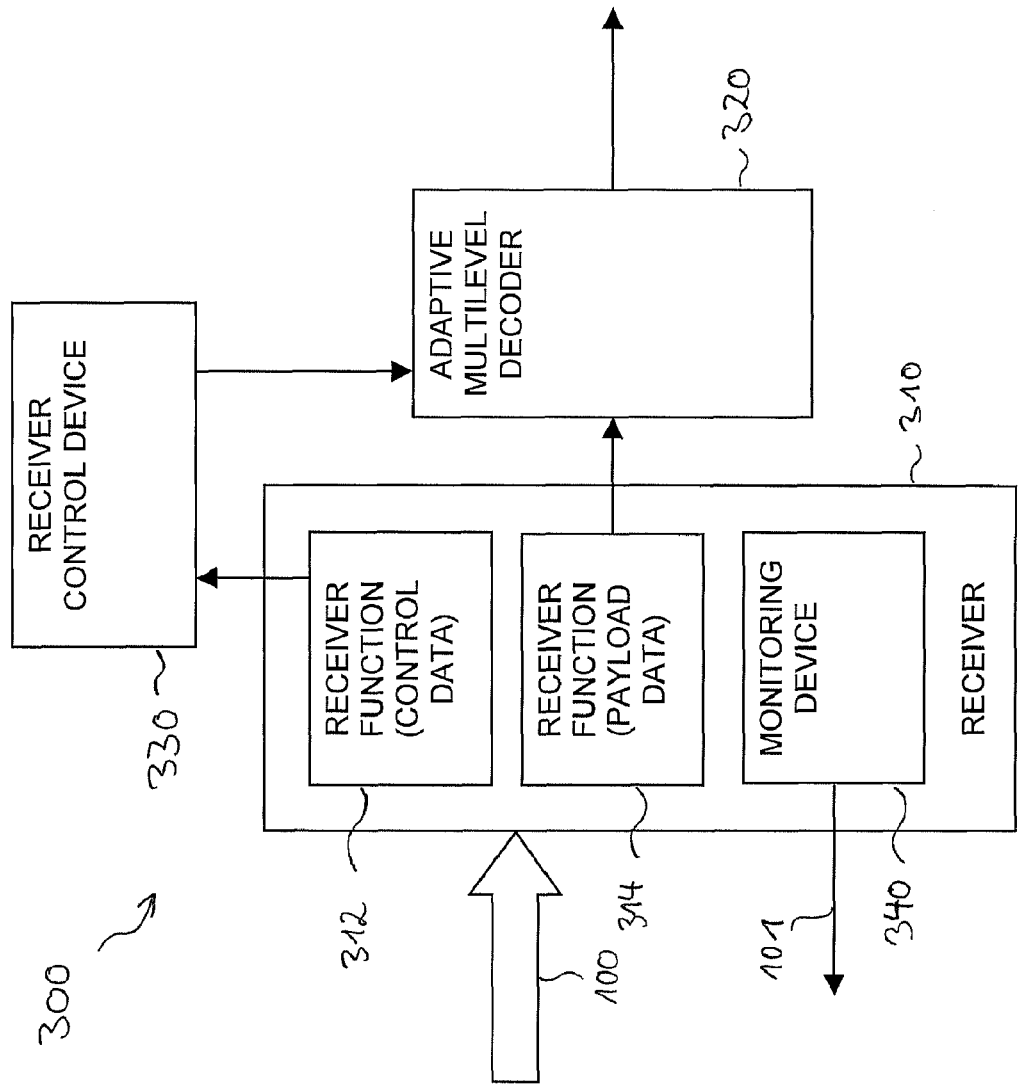
FIG. 2 schematically illustrates a communication equipment according to an embodiment of the invention, the communication equipment being configured for receiving data from a high-order modulation transmission link.

FIG. 2 schematically illustrates a further communication equipment 300 according to an embodiment of the invention. The communication equipment 300 of FIG. 2 is configured for receiving data from the M-QAM transmission link 100 and is configured to cooperate with the communication equipment of FIG. 1.

As illustrated in FIG. 2, the communication equipment 300 comprises a receiver 310 coupled to receive a transmission signal from the transmission link 100, an adaptive multilevel decoder 320, a receiver control device 330 and a monitoring device 340.

The monitoring device 340 is configured to determine parameters of the transmission link 100. In particular, the monitoring device 340 may determine parameters related to the quality of the transmission link 100 such as signal-to-noise ratio, transmission-fault rates, jitter, or the like.

The monitoring device 340 provides a quality signal 101 generated on the basis of the determined parameters to the transmitter control device 230 via a back channel from the receiver to the transmitter, e.g. by using the control data transmission method as shown in block 212 of FIG. 1 but backwards from the receiver to the transmitter.

The receiver 310 comprises a first receiver function 312 for receiving control data from the transmission link 100 and a second receiver function 314 for receiving payload data from the transmission link 100. In the illustrated embodiment, the payload data are received in a payload section including encoded data symbols. As explained in connection with FIG. 1, the control data include control information with respect to the multilevel coding scheme and M-QAM signal constellation used for encoding the data symbols of the payload section. The control data may be included in a header section of a transmission frame or in a separate control frame. Further, it is also possible to transmit the control data via a sideband channel or the like.

The first receiver function 312 receives the control information in the transmitted control data and supplies a corresponding information signal to the control device 330. The information signal supplied to the control device 330 indicates the multilevel coding scheme and M-QAM signal constellation used for encoding the data symbols of the payload section.

The second receiver function 314 receives the payload section including the encoded data symbols from the transmission link 100. A corresponding payload data signal is supplied to the multilevel decoder 320.

On the basis of the information signal received from the first receiver function 312, the receiver control device 330 supplies a control signal to the multilevel decoder 320. By means of the control signal, the multilevel decoder 320 is controlled to decode data symbols of the received payload section according to the multilevel coding scheme and M-QAM signal constellation as indicated by the information in the control data received by the first receiver function 312. The multilevel decoder 320 outputs a data signal corresponding to the decoded data symbols of the received payload section.

It is to be understood that a communication equipment with transmitting functionality as shown in FIG. 1 and a communication equipment with receiving functionality as shown in FIG. 2 may be combined in a single communication equipment, thereby allowing for bi-directional communication on the transmission link 100.

Figure 3:
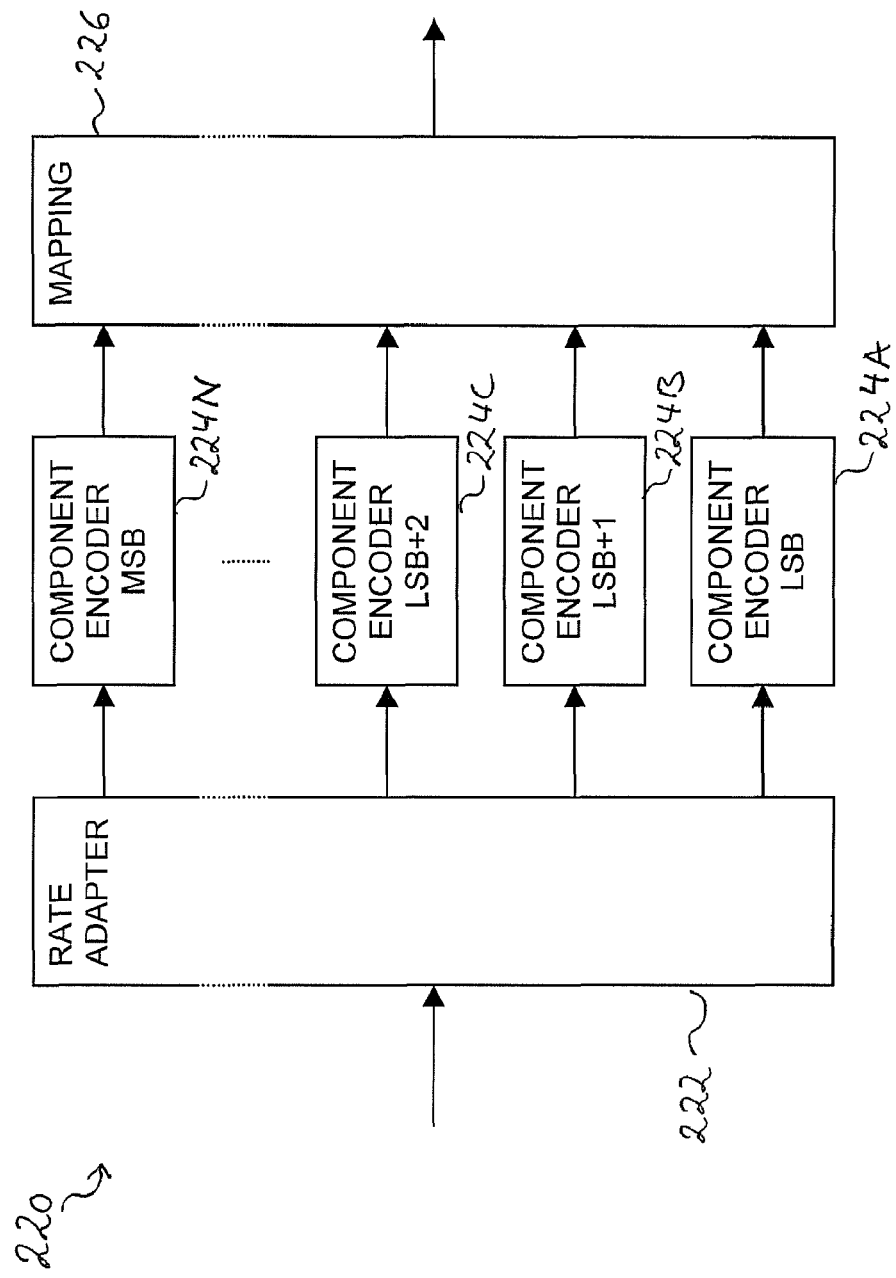
FIG. 3 schematically illustrates a multilevel encoder as used in the communication equipment of FIG. 1.

FIG. 3 schematically illustrates the structure of the multilevel encoder 220 of the communication equipment 200 as shown in FIG. 1.

The multilevel encoder 220 comprises a rate adapter 222. The rate adapter 222 is configured to convert its digital input signal into a number of parallel bit stream signals. The number of the parallel bit stream signals depends on the number of bits in the data symbols of the selected M-QAM signal constellation.

In the following, the bits of the data symbols will be termed as LSB (Least Significant Bit), LSB+n (n indicating the n-th next higher significant bit from the LSB), and as MSB (Most Significant Bit). In some cases, the designation MSBs is used to designate a group of bits comprising the MSB and one or more bits of lower significance.

The multilevel encoder 220 further comprises a component encoder for each of the bits of the data symbol to be encoded. In the illustrated example, the multilevel encoder 220 comprises a component encoder 224A for the LSB, a component encoder 224B for the LSB+1, a component encoder 224C for the LSB+2, and a component encoder 224N for the MSB. This configuration corresponds to the encoding of data symbols having 4 bits, e.g. 16-QAM data symbols. It is to be understood, that for encoding the data symbols of larger M-QAM signal constellations, additional bit streams signals and additional component encoders are provided.

The component encoders 224A, 224B, 224C, 224N each provide an encoded bit stream signal to a mapping stage 226. The mapping stage 226 accomplishes mapping of the bits of the data symbols to positions in the selected M-QAM signal constellation.

In order to provide adaptability of the multilevel encoder 220, the rate adapter 222, the component encoders 224A, 224B, 224C, 224N, and the mapping stage 226 can be configured to operate according to different multilevel coding schemes and different M-QAM signal constellations. With respect to the rate adapter 222 this means that the number of parallel bit stream signals generated at the output of the rate adapter 222 can be adjusted to correspond to the number of bits in the data symbols of the selected M-QAM signal constellation. Similarly, the number of active component encoders 224A, 224B, 224C, 224N can be adjusted to correspond to the number of bits in the data symbols of the selected M-QAM signal constellation. For example, this can be accomplished by providing a number of component encoders which correspond to the largest supported M-QAM signal constellation and by deactivating component encoders which are not needed in the encoding process on the basis of the selected multilevel coding scheme and M-QAM signal constellation.

Further, at least some of the component encoders 224A, 224B, 224C, 224N are adjustable with respect to the component code applied to the input bit stream signal. In accordance with the concept of multilevel coding, each of the component encoders 224A, 224B, 224C, 224N may operate on the basis of a different component code. At least two of the component codes are different from each other. Each component code may be a convolutional code, a parity check code or other type of block code. Other types of codes, e.g. turbo codes or low-density parity check codes, may be used as well. Further, a component code may also correspond to leaving the bits of the input bit stream signal unchanged. In typical multilevel coding schemes, a component code which leaves the input bit stream signal unchanged may be used for a group MSBs. That is to say, in accordance with the concept of multilevel coding as described herein, a component code which changes the input bit stream signal, e.g. a convolutional code or a block code, could be used for only one bit of the data symbols, e.g. the LSB, and component codes leaving the input bit stream signal unchanged could be used for the other bits of the data symbols. Nonetheless, the mapping of all bits of the data symbols to the positions of the selected M-QAM signal constellation may be adapted.

For providing adaptability of the multilevel encoder 220, at least one of the component encoders 224A, 224B, 224C, 224N may be adjustable with respect to the properties of the component code. For example, the type of the component code may be changed, e.g. from a block code to a code leaving the data unchanged or from a convolutional code to a block code. Further, the code rate of the component code may be changed. For example, the code rate of the component code may be increased so as to provide less redundancy and more efficient usage of the capacity of the transmission link. Alternatively, the code rate may be reduced so as to provide more redundancy and stronger protection of the transmitted data.

Further, also the mapping stage 226 may be adjusted so as to provide adaptability of the multilevel encoder 220. In this respect, the number of input bit stream signals supplied to the mapping stage 226 may be adjusted so as to correspond to the number of bits of the data symbols of the selected M-QAM signal constellation. Further, it is to be understood that the mapping process itself typically depends on the encoding of the input bit stream signals.

As the output of the mapping stage 226, data symbols are provided which are encoded according to the selected multilevel coding scheme and M-QAM signal constellation.

Figure 4:
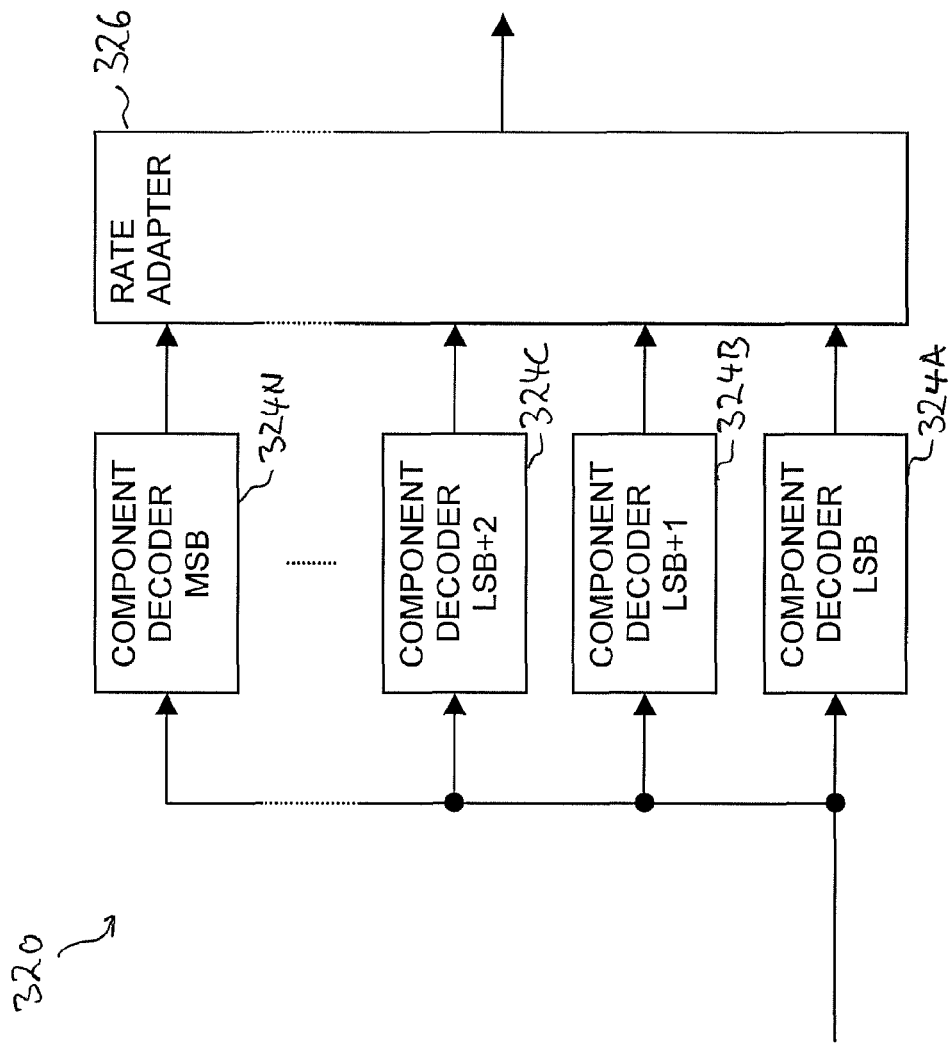
FIG. 4 schematically illustrates a multilevel decoder as used in the communication equipment of FIG. 2.

FIG. 4 schematically illustrates the structure of the multilevel decoder 320 in the communication equipment of FIG. 2.

As illustrated, the multilevel decoder 320 comprises a component decoder 324A, 324B, 324C, 324N for each of the bits of the data symbols of the selected M-QAM signal constellation. Further, the multilevel decoder 320 comprises a rate adapter 326. As mentioned above, the multilevel decoder 320 may be adapted so as to accomplish decoding of received data symbols according to the multilevel coding scheme and M-QAM signal constellation which was selected when transmitting the data symbols.

In the illustrated example, the multilevel decoder 320 comprises a component decoder 324A for the LSB, a component decoder 324B for the LSB+1, a component decoder 324C for the LSB+2, and a component decoder 324N for the MSB. The component decoders 324A, 324B, 324C, 324N perform both tasks of decoding and demapping the received data signal. It is to be understood that depending on the number of bits of the data symbols of the selected M-QAM signal constellation, a different number of component decoders may be provided.

When the multilevel decoder 320 is adapted to operate according to the multilevel coding scheme and M-QAM signal constellation as selected when encoding the data symbols before transmission, the operations of the component decoders 324A, 324B, 324C, 324N will include the inverse operations of the corresponding component encoders 224A, 224B, 224C, 224N and of the mapping stage 226 of the multilevel encoder 220 as illustrated in FIG. 3. That is to say, each of the component decoders will operate on the basis of a respective component code which is the same as the component code used by the corresponding component encoder 224A, 224B, 224C, 224N. The component code used by the component decoders 324A, 324B, 324C, 324N may thus be selected from the same group as the component codes used by the component encoders 224A, 224B, 224C, 224N. Again, it is possible that a component code corresponds to leaving the data unchanged. In this case, the decoding process will still comprise demapping of the encoded bits. In typical examples of multilevel coding, a group of MSBs is transmitted on the basis of a component code which leaves the input bit stream signals unchanged. For such bits, the multilevel decoder 320 will accomplish demapping of the positions in the M-QAM signal constellation with respect to the bits of the data symbols. Here, it is to be understood that the demapping of these bits will depend on the decoding of those bits which have been encoded using a component code which changes the input bit stream signal.

Figure 5:
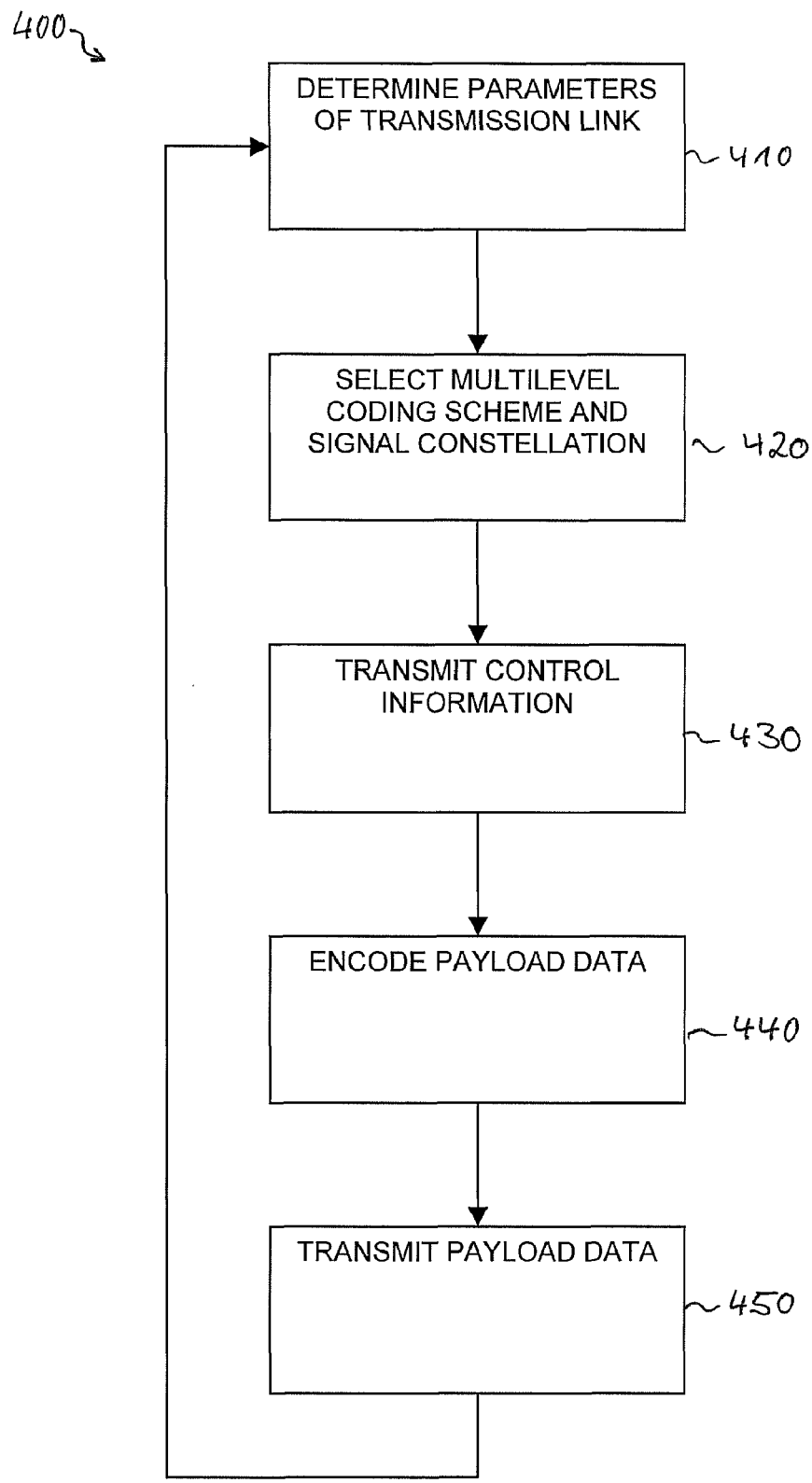
FIG. 5 shows a flow chart for illustrating a data sending method in accordance with an embodiment of the invention.

FIG. 5 shows a flow chart for illustrating a method 400 of sending data on a high-order modulation transmission link. The illustrated method steps may be implemented by components of a communication equipment as illustrated in FIG. 1.

In step 410, parameters of the transmission link are obtained. The parameters may relate to the quality of the transmission link, e.g. signal-to-noise ratio or the like. For example, the quality of the transmission link may be monitored at the receiver, and a corresponding quality signal may be sent back to the transmitter.

In step 420, a multilevel coding scheme and a M-QAM signal constellation are selected on the basis of the determined parameters. For example, if the parameters indicate a good quality of the transmission link, a large M-QAM signal constellation may be selected, e.g. 128-QAM. On the other hand, if the parameters indicate a low quality of the transmission link, a small M-QAM signal constellation may be selected, e.g. 16-QAM. The multilevel coding scheme is selected so as to be in conformity with the selected M-QAM signal constellation. Further, the properties of the multilevel coding scheme may be adjusted depending on the determined parameters. For example, if the parameters indicate a good quality of the transmission link, a multilevel coding scheme providing low redundancy may be selected. On the other hand, if the parameters indicate a low quality of the transmission link, a multilevel coding scheme providing high redundancy may be selected. The redundancy provided by the multilevel coding scheme may generally be increased by using component codes of higher complexity or by decreasing the code rate of a specific code.

In step 430, control information indicating the selected multilevel coding scheme and M-QAM signal constellation is transmitted. This may be accomplished in a header section of a transmission frame, in a separate control frame, or in a sideband channel of the transmission link. If the control information is transmitted in a header section of a transmission frame, it may pertain to a payload section transmitted in the same transmission frame or to one or more payload sections in later transmission frames. In each case, the multilevel coding scheme and M-QAM signal constellation may be changed from one payload section to the next payload section.

In step 440, encoding of payload data is accomplished by subjecting data symbols of the payload data to the selected multilevel coding scheme. In step 450, the encoded data symbols of the payload data are transmitted on the transmission link to the receiver, e.g. in a payload section including the encoded data symbols.

After transmitting the payload data, the method may return to step 410 to determine updated parameters of the transmission link. The determination of updated parameters of the transmission link may be accomplished on a regular basis, e.g. each time after a payload section having a specified length has been transmitted. In addition or as an alternative, the determination of updated parameters of the transmission link may be triggered by predefined events, e.g. an increase of data losses beyond a predefined threshold.

Figure 6:
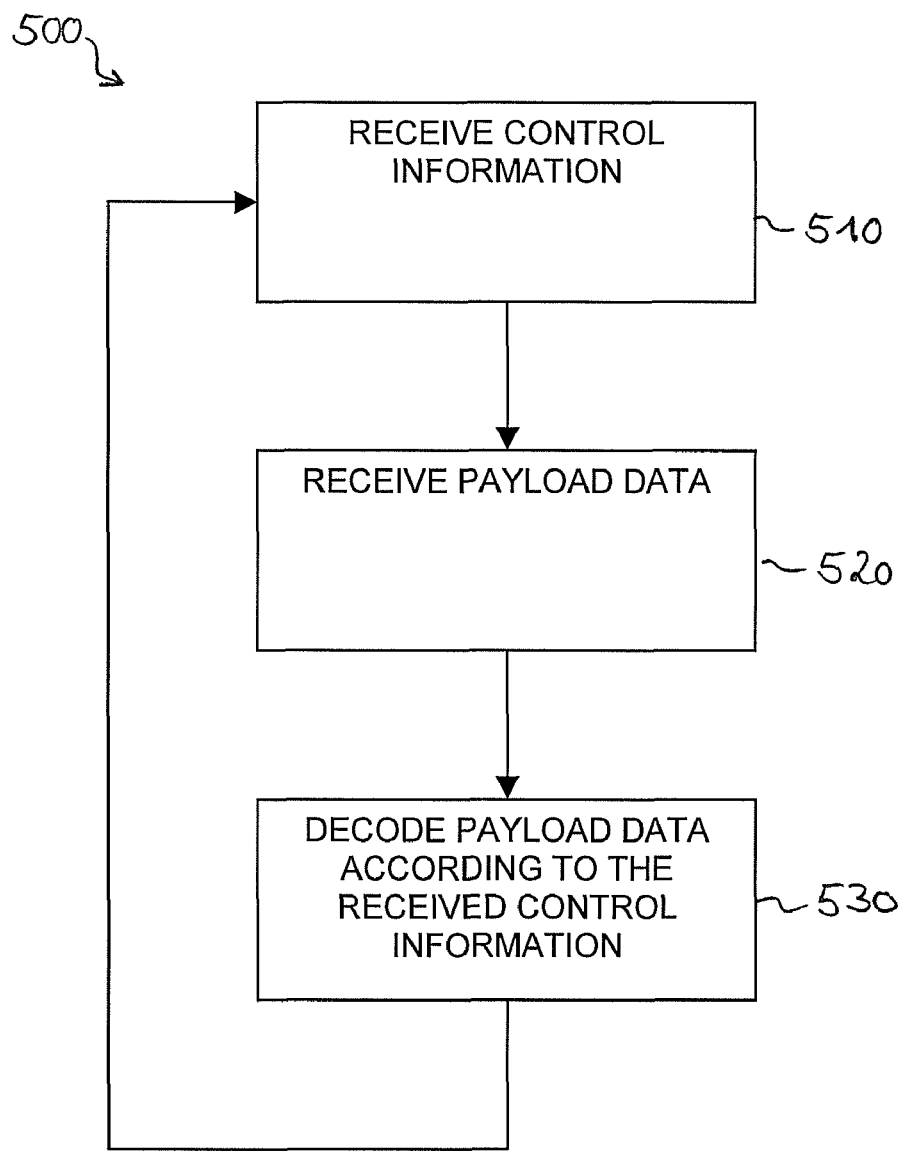
FIG. 6 schematically illustrates a data receiving method in accordance with an embodiment of the invention.

FIG. 6 shows a flow chart illustrating a method 500 of receiving data from a M-QAM transmission link. The steps of the method 500 may be implemented by components of a communication equipment as illustrated in FIG. 2.

In step 510, control information is received. The control information indicates a multilevel coding scheme and an M-QAM signal constellation which was used for encoding transmitted payload data.

In step 520, encoded data symbols of the payload data are received from the transmission link. The payload data symbols may be included in a payload data section of a specified length.

In step 530, the encoded data symbols of the payload data are decoded by subjecting the data symbols to a decoding process on the basis of the multilevel coding scheme and M-QAM signal constellation as indicated by the received control information.

Method steps 510, 520, and 530 may then be repeated in order to receive further payload data.

As can be seen, in the methods 400 and 500 as shown in FIGS. 5 and 6, the multilevel coding scheme and the M-QAM signal constellation may be changed during an ongoing transmission of payload data, i.e. between two consecutive payload sections. In this way, variations in the quality of the transmission link may be taken into account and compensated for during an ongoing transmission.

Figure 7:
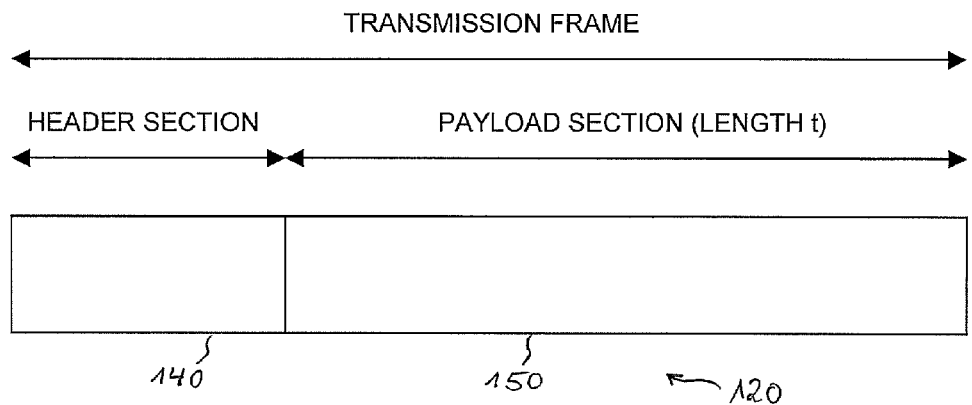
FIG. 7 schematically illustrates a transmission frame as used in a data transmission method according to an embodiment of the invention.

FIG. 7 schematically illustrates a transmission frame 120 which may be used in connection with communication equipments and methods as described in connection with FIGS. 1-6.

As illustrated, the transmission frame 120 includes a header section 140 and a payload section 150. The length of the payload section 150 is denoted by t. The payload section 150 includes payload data in the form of data symbols encoded according to a multilevel coding scheme and M-QAM signal constellation. The header section 140 may include control information. In particular, the header section may include information with respect to the multilevel coding scheme and the M-QAM signal constellation used for encoding the data symbols of the payload section 150. The header section 140 may also be used for other purposes, such as synchronization, or for the transmission of other control parameters. As an alternative to transmitting control information pertaining to the payload section 150 in the same transmission frame 120, the control information may be included in the header section of a previously transmitted transmission frame or may be included in a separate control frame. Further, a sideband channel of the transmission link may be used for transmitting the control information. In each case, it is possible to change the multilevel coding scheme and the M-QAM signal constellation from one payload section to the next payload section.

In the following, it will be considered that each of the component codes of a multilevel coding scheme is based on a specific code frame. For example, in case of convolutional codes, distinct code frames can be can be generated by means of puncturing, i.e. removing some of the coded bits, or by termination, i.e. including predefined bits in the bit sequence which has to be encoded. In the case of block codes, such as parity check codes, the code frames result from the structure of the code itself. In each case, the length of the code frames may be adjusted by puncturing. Accordingly, each code frame defines a corresponding code frame length.

The concepts as described in the following are based on selecting the length of the payload section 150 on the basis of the code frame length of the component codes in such a way that the end of the payload section 150 coincides with the ends of code frames of each component code. That is to say, at the end of a payload section 150, there is also an end of a code frame of each component code. Accordingly, the multilevel coding scheme and the M-QAM signal constellation can be changed in a very efficient manner at the end of the payload section 150. In particular, it can be avoided to transmit incomplete code frames, which typically results in increasing the error probability of the information data, or to fill up incomplete code frames with padding bits, which typically results in an inefficient usage of the capacity of the transmission link. Generally, the use of complex procedures for handling incomplete code frames can be avoided.

In the following, it will be assumed that the payload section 150 consists exclusively of data symbols encoded according to the selected multilevel coding scheme and M-QAM signal constellation. That is to say, the data symbols in the payload section are each based on the same multilevel coding scheme and high-order modulation signal constellation.

In this case, the length of the payload section t is selected to correspond to an integer multiple of the code frame lengths defined by the individual component codes. That is to say, the length t of the payload section 150 may correspond to the least common multiple of the code frame lengths defined by the individual component codes or to an integer multiple thereof. When selecting the least common multiple, the frequency of possible adaptation of the multilevel coding scheme and M-QAM signal constellation increases, which in turn improves the flexibility of adaptation.

In the communication equipments and methods as illustrated in FIGS. 1-6, these concepts may be implemented by selecting the length t of the payload section 150 after the multilevel coding scheme and the M-QAM signal constellation have been selected and the individual component codes and corresponding code frame lengths are known.

Figure 8:
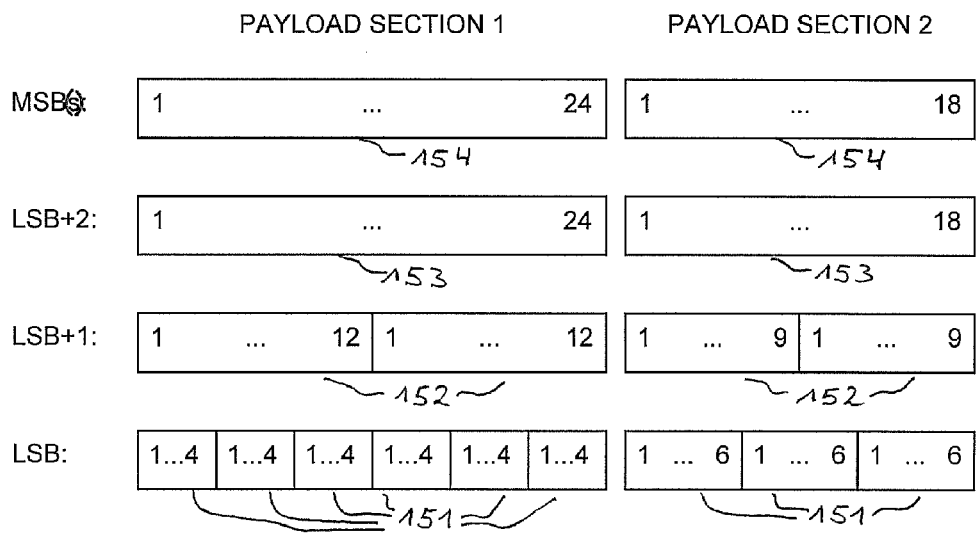
FIG. 8 illustrates exemplary structures of payload sections as used in a data transmission method according to an embodiment of the invention.

In FIG. 8, an example is illustrated in which the above concepts of adjusting the length t of the payload section have been applied to a first payload section (payload section 1) and to a second payload section (payload section 2). Parameters of the first payload section are given in the first row of FIG. 9, and parameters of the second payload section are given in the second row of FIG. 9.

The first and second payload section comprise a bit sequence for the LSB, a bit sequence for the LSB+1, a bit sequence for the LSB+2, and corresponding bit sequences for each of the MSBs. The bit sequences of the LSB comprise code frames 151, the bit sequences of the LSB+1 comprise code frames 152, the bit sequences of the LSB+2 comprise code frames 153, and the bit sequences of the MSBs comprise code frames 154.

The data symbols of the first payload section are based on a 128-QAM signal constellation. Accordingly, the data symbols have a total number of 7 bits, i.e. LSB, LSB+1, LSB+2, and four MSBs.

In the first payload section, the component code of the LSB defines a code frame length of four data symbols, the component code of the LSB+1 defines code frames having a length of twelve data symbols, and the component code of the LSB+2 defines a code frame length of 24 data symbols. The component codes of the MSBs, which leave the data unchanged, correspond to a code frame length of one data symbol.

In the illustrated example, the component codes of the LSB and the LSB+1 are based on the same convolutional mother code having a code rate of 1/2, but use a different puncturing. In this way, the component code of the LSB is provided with a code rate of 3/4, and the component code of the LSB+1 is provided with a code rate of 11/12. The component code of the LSB+2 is a parity check code with a code rate of 23/24.

The component codes of the MSBs each leave data unchanged, which corresponds to a code rate of 1/1.

As can be seen, after the length of the payload section of 24 data symbols, there is an end of a code frame in each of the component codes of the LSB, the LSB+1, the LSB+2, and the MSBs. Accordingly, after the end of the first payload section, a different multilevel coding scheme and a different M-QAM signal constellation may be selected without disturbing the decoding process.

In the second payload section, the data symbols are based on a 16-QAM signal constellation. Accordingly, the data symbols each have four bits, i.e. the LSB, the LSB+1, the LSB+2, and a single MSB.

In the second payload section, the component codes of the LSB and of the LSB+1 are again based on the convolutional mother code with a code rate of 1/2. By means of puncturing, the component code of the LSB is provided with a code frame length of six and a code rate of 5/6, and the component code of the LSB+1 is provided with a code frame length of nine and a code rate of 8/9. Accordingly, it is possible to continuously use the same convolutional codes from the first payload section to the second payload section with merely adapting the puncturing so as obtain different code rates. In the second payload section, the component codes of the LSB+2 and of the MSB correspond to leaving the incoming bit stream signal unchanged, which corresponds to a code frame length of one and a code rate of 1/1. The length t of the second payload section is selected to be 18 data symbols.

Again, at the end of the second payload section, there is also an end of a code frame of each of the component codes, thereby allowing for efficient switching of the multilevel coding scheme or M-QAM signal constellation at the end of the payload section.

In the table of FIG. 9, parameters of the first payload section and of the second payload section are summarized. The table also includes the number of uncoded data bits, i.e. bits carrying non-redundant information, transmitted in the payload section, and the number of coded transmission bits per payload section.

The number of uncoded data bits per payload section is obtained by multiplying the sum of the code rates of the individual component codes of each bit with the number of the data symbols. In the case of the first payload section the number of uncoded data bits is thus obtained according to (3/4+11/12+23/24+1/1+1/1+1/1+1/1)·24=159.

In the case of the second payload section, the number of uncoded data bits is obtained according to (5/6+8/9+1/1+1/1)·18=67.

The number of coded transmission bits per payload section is obtained by multiplying the total number of bits of a data symbol with the number of data symbols in the payload section. Accordingly, for the first payload section, the number of coded transmission bits is obtained according to

24·7=168.

In the second payload section, the number of coded transmission bits is obtained according to

18·4=72.

As can be seen, in each payload section, the number of bits carrying non-redundant information and the number of data symbols are integer numbers. Therefore, incomplete code frames at the end of a payload section are avoided.

Figure 10:
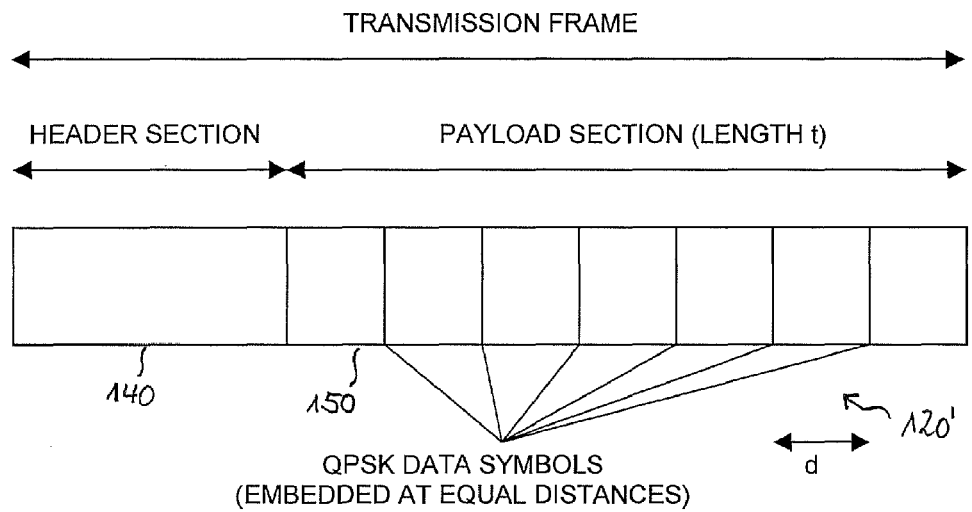
FIG. 10 schematically illustrates a transmission frame with embedded QPSK data symbols as used in a data transmission method according to a further embodiment of the invention.

In the following, a situation will be considered, in which the payload section consists of data symbols encoded to a multilevel coding scheme and a M-QAM signal constellation with M>4 and of embedded QPSK data symbols encoded according to the multilevel coding scheme and a QPSK signal constellation. A corresponding transmission frame 120' is schematically illustrated in FIG. 10. The transmission frame 120' comprises a header section 140 and a payload section 150. The header section 140 and the payload section 150 are substantially the same as explained in connection with FIG. 7. Accordingly, the following description focuses on the differences of the transmission frame 120' as compared to the transmission frame 120 of FIG. 7. The transmission frame 120' may be used in connection with the communication equipments and methods as explained in connection with FIGS. 1-6. However, it is to be understood that the concept of embedding QPSK data symbols between M-QAM data symbols may also be used without adapting the multilevel coding scheme and the M-QAM signal constellation. In such a case, the communication equipment as illustrated in FIG. 1 could be provided with a non-adaptive multilevel encoder, and the communication equipment as illustrated in FIG. 2 could be provided with a non-adaptive multilevel decoder. Further, the monitoring device of FIG. 2, and the transmitter and receiver control devices of FIGS. 1 and 2 could be omitted.

As illustrated in FIG. 10, the QPSK data symbols are embedded between the M-QAM data symbols at predefined positions. In the illustrated example, the QPSK data symbols are embedded at equal distances, the shortest distance between two QPSK data symbols being denoted by d. Just as the M-QAM data symbols, the QPSK data symbols carry payload data.

Figure 11:
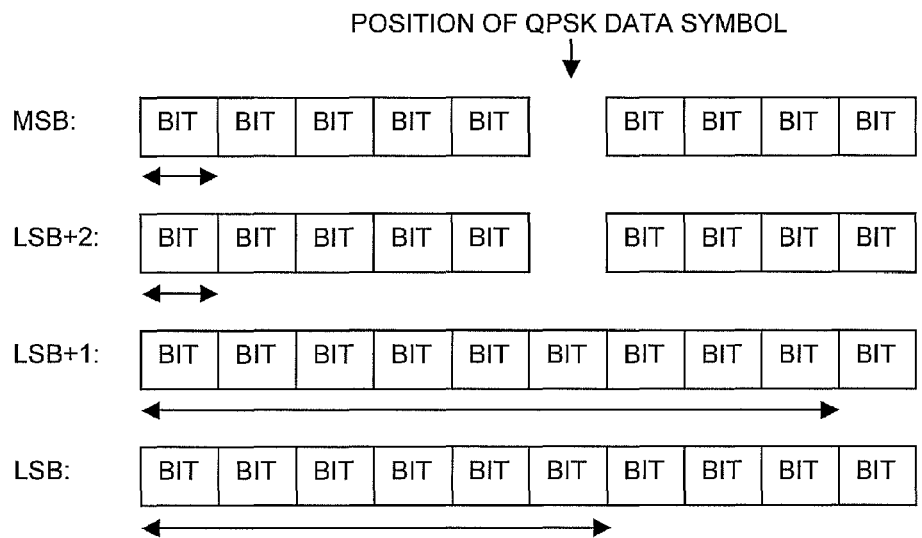
FIG. 11 schematically illustrates bit sequences formed when embedding QPSK data symbols between M-QAM data symbols.

As mentioned above, the QPSK data symbols are encoded according to the same multilevel coding scheme as the M-QAM data symbols. For this purpose, bits of the QPSK data symbols are assigned to corresponding bits of the M-QAM data symbols. That is to say, a correspondence is established between two of the at least three bits of the M-QAM data symbols and the two bits of the QPSK data symbols. In a typical example, the LSB of the QPSK data symbols is assigned to the LSB of the M-QAM data symbols, and the LSB+1 of the QPSK data symbols is assigned to the LSB+1 of the M-QAM data symbols. This situation is schematically illustrated in FIG. 11, in which a vertical arrow illustrates the position of an embedded QPSK data symbol in a sequence of M-QAM data symbols. As can be seen, bit sequences are formed which include bits of the QPSK data symbols interposed between the corresponding bits of the M-QAM data symbols. At the position of the embedded QPSK data symbol, bit sequences of the non-corresponding bits of the M-QAM data symbols, in the example of FIG. 11 the LSB+2 and the MSB, include a gap in which no bit is transmitted.

In order to apply the multilevel coding scheme to the M-QAM data symbols and to the QPSK data symbols, the bit sequences including the bits of the QPSK data symbols are encoded by the component codes of the corresponding bits of the M-QAM data symbols. In the example as illustrated in FIG. 11, this means that the component code of the LSB continuously encodes the bit sequence including the LSB of the QPSK data symbols, and that the component code of the LSB+1 continuously encodes the bit sequence including the LSB+1 of the QPSK data symbols.

In FIG. 11, exemplary code frame lengths are schematically illustrated by horizontal arrows. For the LSB, the code frame length is six. For the LSB+1, the code frame length is nine. As can be seen, a code frame may extend over the position of the embedded QPSK data symbol. This may also occur for the bit sequences formed of the non-corresponding bits of the M-QAM data symbols.

Figure 12:
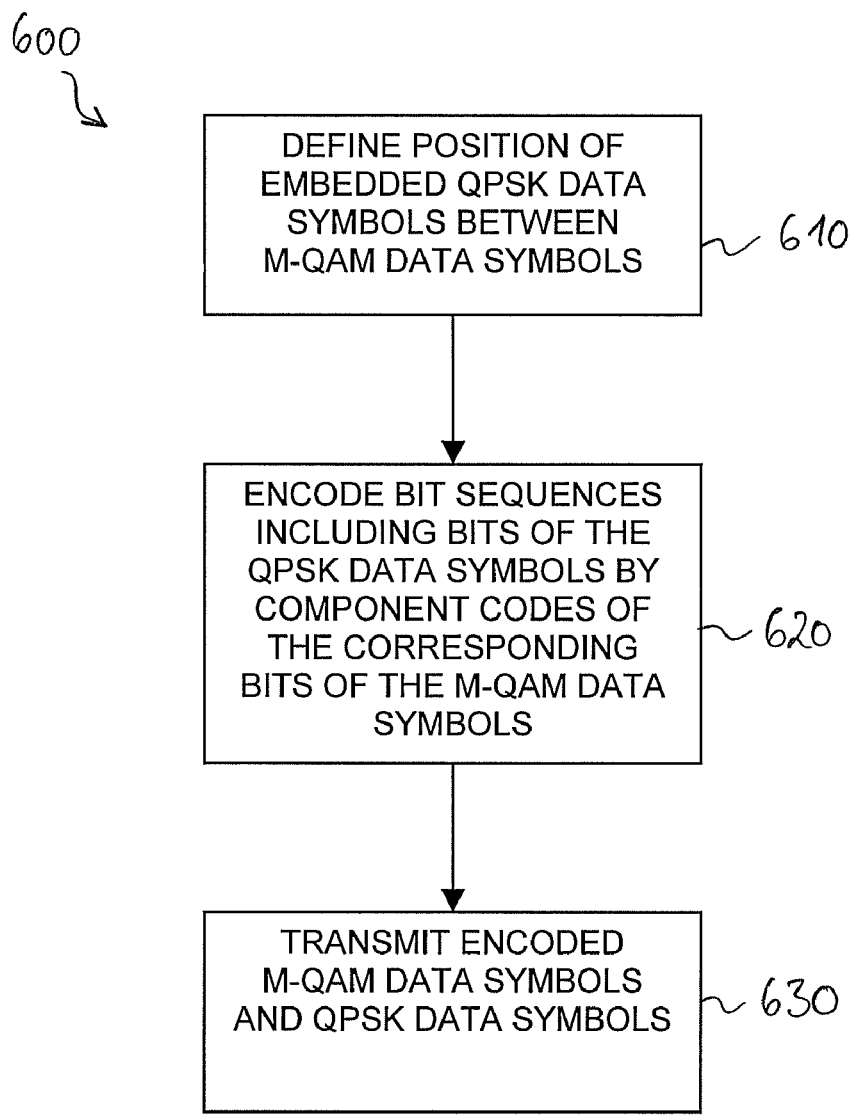
FIG. 12 shows a flow chart for illustrating a data sending method according to an embodiment of the invention.

FIG. 12 shows a flow chart illustrating a method of sending data on a high-order modulation transmission link which implements the above concepts of embedding QPSK data symbols between M-QAM data symbols. The steps of the method 600 may be implemented by a multilevel encoder and a transmitter, e.g. as illustrated in FIG. 1.

In step 610, the position of embedded QPSK data symbols between M-QAM data symbols is defined. In this way, the positions of the QPSK data symbols are known in the encoding and decoding process. For example, the QPSK data symbols may be embedded at equal distances.

In step 620, the M-QAM data symbols and the QPSK data symbols are encoded on the basis of the same multilevel coding scheme. For this purpose, bit sequences including bits of the QPSK data symbols are encoded by the component codes of the corresponding bits of the M-QAM data symbols.

In step 630, the encoded M-QAM data symbols and embedded QPSK data symbols are transmitted.

Figure 13:
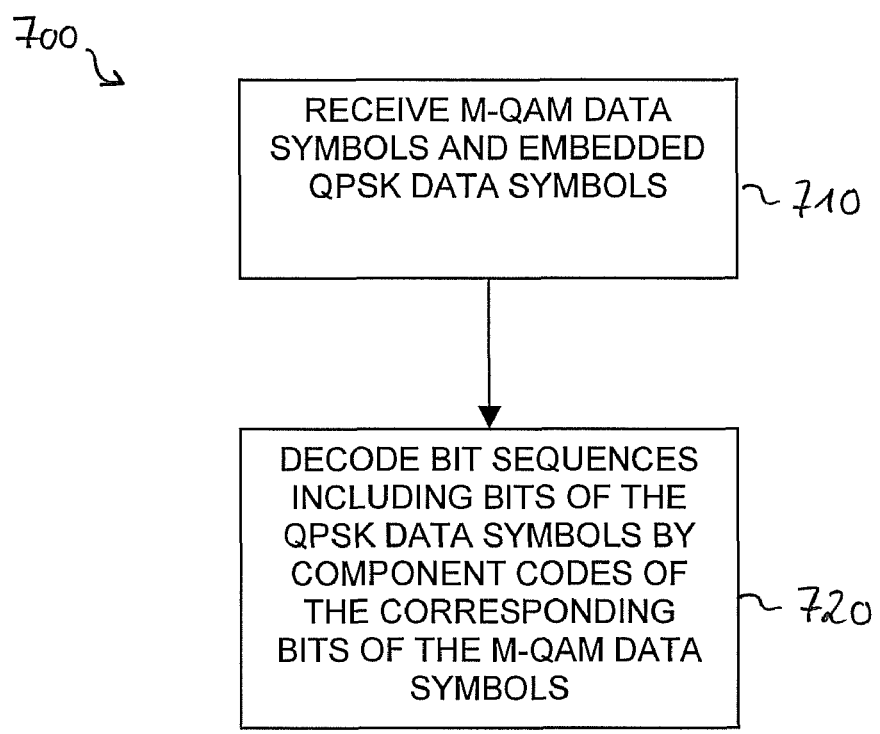
FIG. 13 shows a flow chart for illustrating a data receiving method according to an embodiment of the invention.

FIG. 13 shows a flow chart illustrating a method 700 of receiving data from a high-order modulation transmission link which implements the above concepts of embedding QPSK data symbols between M-QAM data symbols. The steps of the method 700 may be implemented by a receiver and a multilevel decoder, e.g. as illustrated in FIG. 2.

In step 710, the M-QAM data symbols and the embedded QPSK data symbols are received.

In step 720, the M-QAM data symbols and the embedded QPSK data symbols are decoded on the basis of the same multilevel coding scheme. For this purpose, bit sequences including bits of the QPSK data symbols are decoded by the component codes of the corresponding bits of the M-QAM data symbols.

The methods as illustrated by the flow charts of FIG. 12 and FIG. 13 may be combined with the adaptation methods as illustrated by the flow charts of FIGS. 5 and 6. In this case, steps 610 and 620 of the method 600 would be part of step 440 of the method 400, and step 720 of the method 700 would be part of step 530 of the method 500.

In the following, concepts will be described which allow for suitably adjusting the length t of the payload section 150 including the encoded data symbols with embedded QPSK data symbols so as to allow for an efficient adaptation of the multilevel coding scheme and M-QAM signal constellation.

Again, the length t of the payload section is selected in such a way that the end of the payload section coincides with the ends of code frames of each component code. Assuming that the QPSK data symbols are embedded at equal distances denoted by d, this is accomplished by selecting the length t of the payload section to meet the following conditions:

The length of the payload section corresponds to an integer multiple of the code frame length defined by the component codes of the corresponding bits of the M-QAM data symbols and of the QPSK data symbols.

A parameter defined by $$\frac{td}{d+1}$$

corresponds to an integer multiple of the code frame length defined by the component codes of non-corresponding bits of the M-QAM data symbols and of the QPSK data symbols.

According to an embodiment, the smallest value meeting these conditions is selected, thereby providing a good flexibility of the adaptation process.

When denoting the code frame lengths of the corresponding bits in the M-QAM data symbols and in the QPSK data symbols as $I_{c,0}$, $I_{c,1}$, and the code frame lengths of the non-corresponding bits in the M-QAM data symbols as $I_{nc,0}$, $I_{nc,1}, \ldots, I_{nc,k}$, k being the number of non-corresponding bits in a M-QAM data symbol, the above conditions can be rewritten as follows:

1. $t = a \cdot lcm(I_{c,0}; I_{c,1})$, with $a \in \{1, 2, 3, 4, \ldots\}$

2. $t = \frac{d+1}{d} \cdot b \cdot lcm(I_{nc,0}; I_{nc,1}; \ldots ; I_{nc,k})$, with $b \in \{1, 2, 3, 4, \ldots\}$, wherein "lcm" denotes the least common multiple of the arguments provided in brackets.

Now an example will be considered, in which the LSB of the M-QAM data symbols corresponds to the LSB of the QPSK data symbols, and the LSB+1 of the M-QAM data symbols corresponds to the LSB+1 of the QPSK data symbols, as illustrated in FIG. 11. The distance d between the embedded QPSK data symbols is assumed to be d=8, the length of the code frames of the LSB is assumed to be six, e.g. with a code rate of 5/6, the length of the code frames of the LSB+1 is assumed to be twelve, e.g. with a code rate of 11/12, the length of the code frames of the LSB+2 is assumed to be 24, e.g. with a code rate of 23/24, and the further MSBs are assumed to have component codes which leave the data unchanged, corresponding to a code frame length of one and to a code rate of 1/1. This gives:

1. $t = a \cdot lcm(6; 12) = a \cdot 12$, with $a \in \{1, 2, 3, 4, \ldots\}$

2. $t = \frac{9}{8} \cdot b \cdot lcm(24; 1) = 27 \cdot b$, with $b \in \{1, 2, 3, 4, \ldots\}$ This leads to:

$$a = \frac{9}{4} \cdot b,$$

and with $b=4$ finally to:

$t=9 \cdot 12=108$.

Accordingly, by proper selection of the length t of the payload section 150, the alignment of the end of the payload section 150 with the ends of code frames of each individual component code can also be obtained when using embedded QPSK data symbols.

In the following, concepts will be explained which allow for using the embedded QPSK data symbols to improve the coding gain of the multilevel coding scheme.

Figure 14:
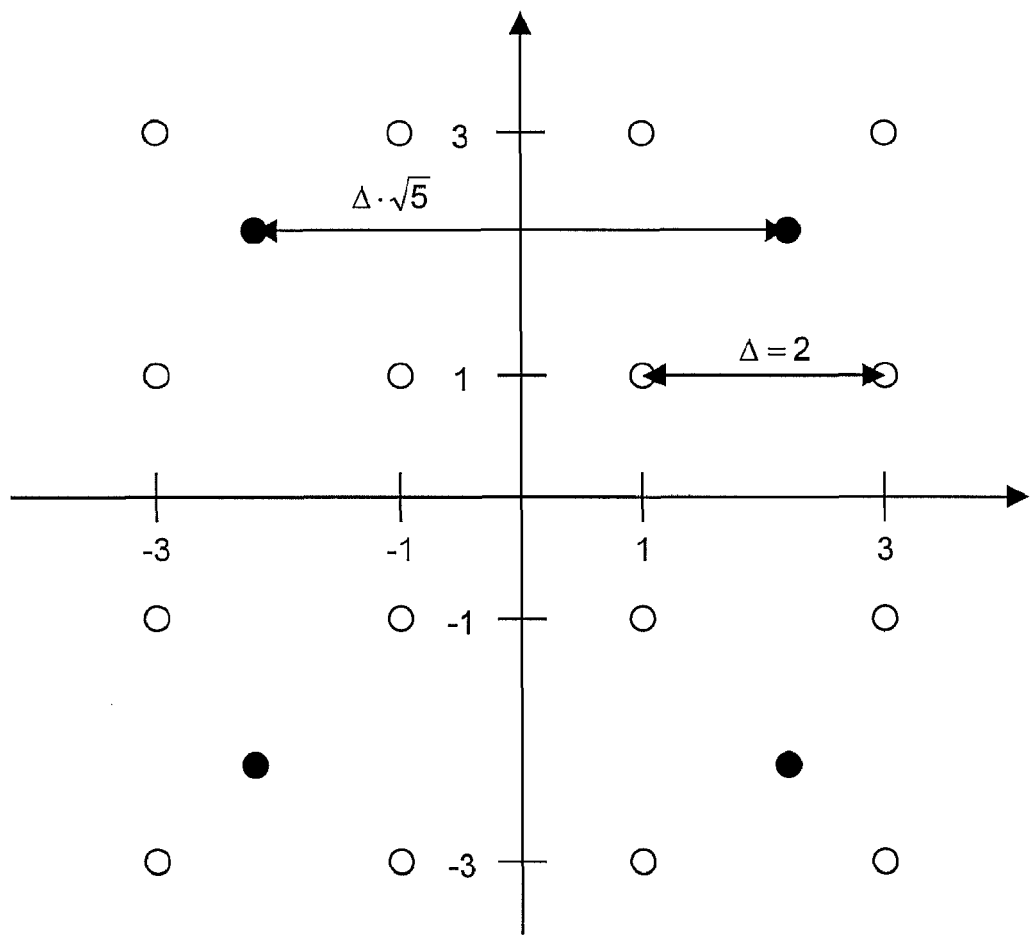
FIG. 14 schematically illustrates exemplary signal constellations of M-QAM data symbols and embedded QPSK data symbols.

For this purpose, it is considered that the embedded QPSK data symbols in the payload section are more reliable than the M-QAM data symbols. This is due to the larger distance between positions in a QPSK signal constellation in comparison to the distance between positions in a M-QAM signal constellation with M>4. This is illustrated in FIG. 14, in which a 16-QAM signal constellation is illustrated by open circles, and a QPSK signal constellation with equivalent power is illustrated by solid circles. As can be seen, the minimal distance between two positions in the 16-QAM signal constellation is $\Delta=2$. As compared to that, the minimal distance between two positions in the QPSK signal constellation is $\Delta \cdot \sqrt{5}$.

Accordingly, the decoding process can be improved by assigning a weight to the QPSK data symbols which is larger than a weight assigned to the M-QAM data symbols. For example, when calculating metrics in the decoding process, the metrics of the QPSK data symbols can be weighted by special weight factors which are larger than weight factors of the M-QAM data symbols.

When considering the exemplary 16-QAM signal constellation and QPSK signal constellation as illustrated in FIG. 14, the minimum distance between two positions in the QPSK signal constellation is $\Delta \cdot \sqrt{5}$. Assuming an additive white Gaussian noise on the transmission link, the reliability of received data symbols depends on the squared minimum distance between two symbols in the signal constellation. Accordingly, the QPSK symbols having equivalent power are about five times more reliable than the 16-QAM data symbols.

Figure 15:
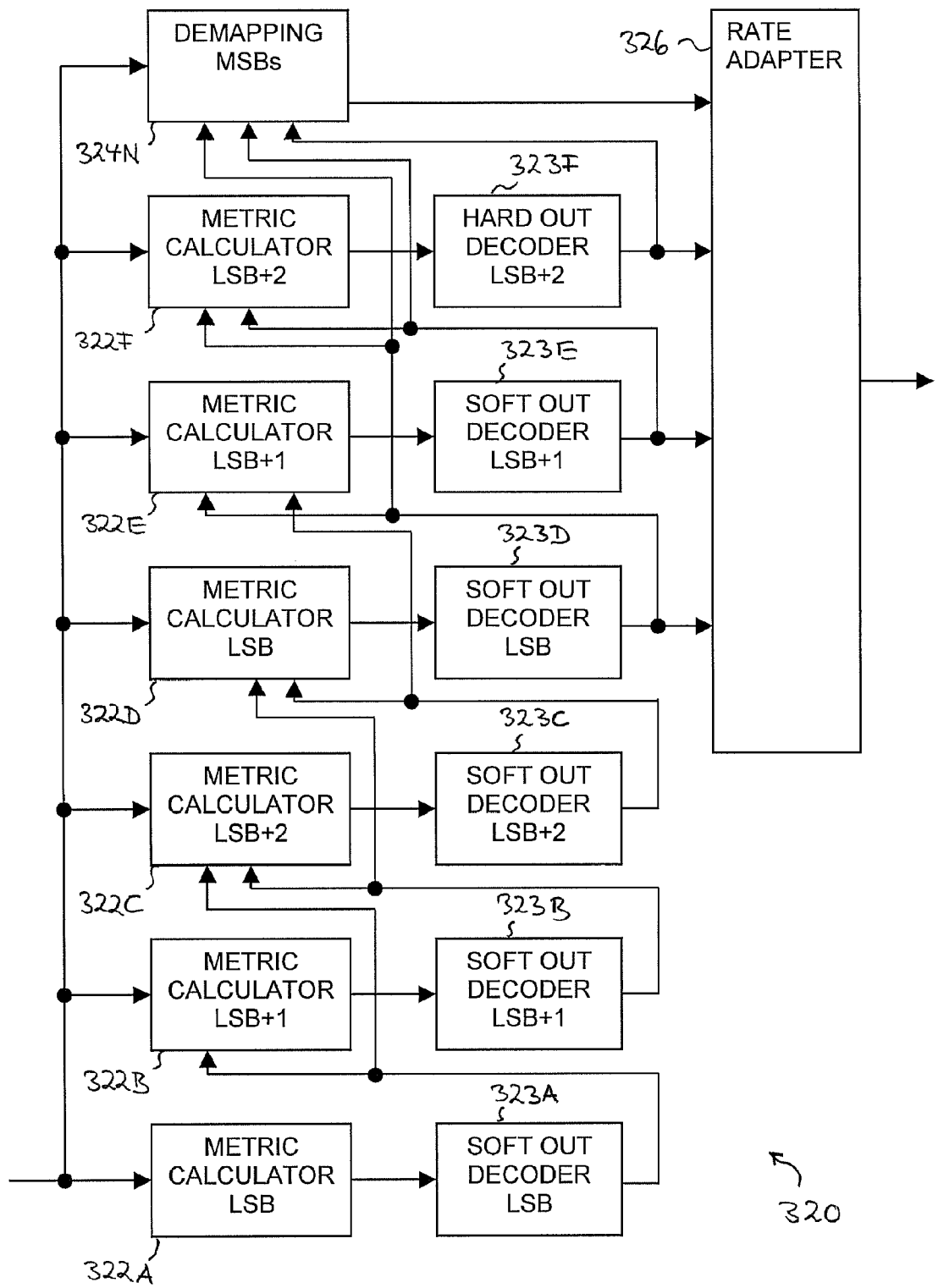
FIG. 15 schematically illustrates an implementation of a multilevel decoder in accordance with an embodiment of the invention.

FIG. 15 schematically illustrates an implementation of the multilevel decoder 320 as shown in FIG. 2. This implementation is based on a multi-stage decoding process. The illustrated decoding process involves calculating a reliability value for decoded bits of the data symbols. The reliability value is then used in a further stage of the decoding process. This concept of outputting a decoded bit together with an associated reliability value is also referred to as soft out decoding. As compared to that, outputting a decoded bit without an associated reliability value is referred to as hard out decoding.

According to an embodiment of the invention, a first stage of the decoding process includes calculating a reliability value for decoded bits of M-QAM data symbols and setting a predefined reliability value for decoded bits of the QPSK data symbols. Accordingly, for the bits of the QPSK symbols, the reliability value can be set to a value which reflects the increased reliability as compared to the bits of the M-QAM data symbols. The reliability value is then used in a second stage of the decoding process. The first stage and the second stage of the decoding process may be iteration stages or bit decoding stages.

As illustrated in FIG. 15, the multilevel decoder 320 comprises a first metric calculator 322A for the LSB, a first metric calculator 322B for the LSB+1, and a first metric calculator 332C for the LSB+2. Further, the multilevel decoder 320 comprises a first soft out decoder 323A for the LSB, a first soft out decoder 323B for the LSB+1, and a first soft out decoder 323C for the LSB+2. The first metric calculators 322A, 322B, 322C and the first soft out decoders 323A, 323B, 323C form a first iteration stage of the multilevel decoder 320.

Further, the multilevel decoder 320 comprises a second metric calculator 322D for the LSB, a second metric calculator 322E for the LSB+1, and a second metric calculator 322F for the LSB+2. Similarly, a second soft out decoder 323D for the LSB and a second soft out decoder 323E for the LSB+1 are provided. Further, a hard out decoder 323F for the LSB+1 is provided. The second metric calculators 322D, 322E, 322F, the second soft out decoders 323D, 323E, and the hard out decoder 323F form a second iteration stage of the multilevel decoder 320.

The first and second metric calculator 322A, 322D for the LSB and the first and second soft out decoder 323A, 323D for the LSB form a component decoder for the LSB. The first and second metric calculator 322B, 322E for the LSB+1 and the first and second soft out decoder 323B, 323E for the LSB+1 form a component decoder for the LSB+1. The first and second metric calculator 322C, 322F for the LSB+2, the soft out decoder 323C, and the hard out decoder 323F for the LSB+2 form a component decoder for the LSB+2.

In addition, component decoders for the MSBs are provided by a demapping function 324N. That is to say, the component decoders for the MSBs are based on a component code which leaves the input bit stream signal unchanged. Further the multilevel decoder 320 includes a rate adapter 326 to convert the parallel input bit stream signals to a digital output signal of a desired format.

The above components of the multilevel decoder can also be grouped into different bit decoding stages, the metric calculator 322A and the soft out decoder 323A forming a first bit decoding stage, the metric calculator 322B and the soft out decoder 323B forming a second bit decoding stage, the metric calculator 322C and the soft out decoder 323C forming a third bit decoding stage, the metric calculator 322D and the soft out decoder 323D forming a fourth bit decoding stage, the metric calculator 322E and the soft out decoder 323E forming a fifth bit decoding stage, the metric calculator 322F and the hard out decoder 323F forming a sixth bit decoding stage, and the demapping function 324N providing a seventh bit decoding stage.

The received encoded data signal is supplied to the metric calculators 322A, 322B, 322C, 322D, 322E, 322F. Each of the metric calculators 322A, 322B, 322C, 322D, 322E, 322F supplies an output signal indicating the calculated metric to the decoder 323A, 323B, 323C, 323D, 323E, 323F of the same level.

The first soft out decoder 323A for the LSB supplies the decoded bit together with an associated reliability value to the first metric calculator 322B for the LSB+1 as well as to the first metric calculator 322C for the LSB+2. The first soft out decoder 323B for the LSB+1 supplies the decoded bit and an associated reliability value to the first metric calculator 322C for the LSB+2 as well as to the second metric calculator 322D for the LSB. The first soft out decoder 323C for the LSB+2 supplies the decoded bit and an associated reliability value to the second metric calculator 322D for the LSB as well as to the second metric calculator 322E for the LSB+1. The second soft out decoder 323D for the LSB supplies the decoded bit and an associated reliability value to the second metric calculator 322E for the LSB+1 as well as to the second metric calculator 322F for the LSB+2 and to the demapping function 324N for the MSBs. The second soft out decoder 323E for the LSB+1 supplies the decoded bit and an associated reliability value to the second metric calculator 322F for the LSB+2 as well as to the demapping function 324N for the MSBs. The second soft out decoder 323F for the LSB+2 supplies the decoded bit to the demapping function 324N. Further, each of the second soft out decoders 323D, 323E, 323F, and the demapping function 324N supply the decoded or demapped bits to the rate adapter 326. The decoded bit and the associated reliability value are thus passed from one bit decoding stage to one or two higher bit decoding stages.

In the exemplary configuration of the multilevel decoder 320 as illustrated in FIG. 15, it is assumed that in the received data symbols the LSB, the LSB+1, and the LSB+2 have been encoded by different component codes, whereas the MSBs have been encoded on the basis of a component code which leaves the data unchanged. Accordingly, the LSB, the LSB+1, and the LSB+2 are subjected to a soft out decoding process, whereas the MSBs are subjected to a hard-decision demapping process which depends on the decoding results of the LSB, the LSB+1, and the LSB+2. In accordance with the concepts of soft out decoding, each soft out decoder 323A, 323B, 323C, 323D, 323E generates the decoded bit together with a reliability value. The decoded bits of all lower levels together with their associated reliability value form the basis for the calculation of the LSB+2. Thus the decoding of the LSB+2 is based on the results of the decoding process of the LSB and the LSB+1. These results include the decided bit and the associated reliability value.

As further illustrated in FIG. 15 and mentioned above, the decoding process includes a first iteration stage and a second iteration stage. The illustrated decoding process may thus also be referred to as iterative decoding. It is to be understood that in other implementations of the multilevel decoder 320 more than two iteration stages of the decoding process may be provided.

In the configuration of the multilevel decoder as shown in FIG. 15, the second stage of the decoding process for the LSB, the LSB+1, and the LSB+2 is in each case based on the decoded bits and the associated reliability values of the respective two lower levels. For example, the second decoding process of the LSB+1 is based on the results of the first decoding process of the LSB+2 and the results of the second decoding process of the LSB. When considering an example with n component codes which are subjected to an iterative decoding process, each level of the decoding process may be based on the results of the decoding process of the previous n−1 levels.

According to an embodiment of the invention, the above-described process using calculated reliability values is used for the M-QAM data symbols. In the case of the embedded QPSK data symbols, the decoding process is modified.

In the first place, the decoding of the LSB+2 and the demapping of the MSBs is omitted because these bits are not included in the QPSK data symbols. Further, the reliability value propagated to the next level of the decoding process is ignored, i.e. assumed to be high, or set to a high value whenever an embedded QPSK data symbol is decoded. In this way, it can be avoided that the decoding process uses a reliability information for the bits of the QPSK data symbols which underestimates the actual reliability due to the calculation of the reliability value on the basis of a sequence of consecutively decoded bits, which include less reliable M-QAM data symbols.

In the specific configuration as illustrated in FIG. 15, the above concepts of using predefined reliability values for the bits of the embedded QPSK data symbols means that the metric calculations for the LSB+1 in the first and second metric calculator 322B and 322E as well as the second metric calculation for the LSB in metric calculator 322D need to operate under the assumption that the received results of the decoding process of the LSB or LSB+1 are highly reliable.

It is to be understood that the embodiments, concepts and examples as described above are merely illustrative and not intended to limit the scope of the invention. The illustrated concepts and examples are susceptible to various modifications and can be combined with each other as appropriate. For example, the improved decoding processes using the embedded QPSK data symbols as described in connection with FIGS. 14 and 15 may be used in connection with the adaptive multilevel coding processes as described in connection with FIGS. 1-6. However, it is also possible to separately implement the described concept, e.g. to use the QPSK data symbols embedded between the M-QAM data symbols without adaption of the multilevel coding process. Moreover, the described concepts are not limited to M-QAM signal constellation. Other high order modulation schemes, such as M-PSK, may be used as well.

The invention claimed is:

1. A method of transmitting data on a high-order modulation transmission link, comprising:
    determining parameters of the transmission link;
    selecting, on the basis of the determined parameters, a multilevel coding scheme and a high-order modulation signal constellation for encoding data symbols, the multilevel coding scheme providing a respective component code for each bit of the data symbols, at least two of the component codes being different from each other and the component codes each defining a corresponding code frame length;
    transmitting control information with respect to the selected multilevel coding scheme and high-order modulation signal constellation, and transmitting a payload section with data symbols encoded according to the selected multilevel coding scheme and high-order modulation signal constellation, and
    selecting the length of the payload section on the basis of the code frame lengths in such a way that the end of the payload section coincides with the ends of code frames of each component code.

2. The method according to claim 1, wherein the payload section consists exclusively of data symbols encoded according to the selected multilevel coding scheme and high-order modulation signal constellation; and wherein the length of the payload section is selected to correspond to an integer multiple of the code frame lengths.

3. The method according to claim 2, wherein the length of the payload section is selected to correspond to the least common multiple of the code frame lengths.

4. The method according to claim 1,
    wherein the payload section consists of first data symbols encoded according to the selected multilevel coding scheme and an M-level Quadrature Amplitude Modulation (M-QAM) or M-level Phase Shift Keying (M-PSK) signal constellation with M>4 and of Quadrature Phase Shift Keying (QPSK) data symbols encoded according to the selected multilevel coding scheme and a QPSK signal constellation;
    wherein bits of the QPSK data symbols are assigned to corresponding bits of the first data symbols;
    wherein the QPSK data symbols are embedded at predefined positions between the first data symbols, thereby forming bit sequences including the bits of the QPSK data symbols interposed between the corresponding bits of the first data symbols; and
    wherein the bit sequences including the bits of the QPSK data symbols are encoded by the component codes of the corresponding bits of the first data symbols.

5. The method according to claim 4,
    wherein the QPSK data symbols are embedded at equal distances; and
    wherein the length of the payload section is selected to meet the following conditions:
        the length of the payload section corresponds to an integer multiple of the code frame lengths defined by the component codes of the corresponding bits of the first data symbols and of the QPSK data symbols, and a parameter defined by $$\frac{td}{d+1}$$

corresponds to an integer multiple of the code frame lengths defined by the component codes of non-corresponding bits of the first data symbols and of the QPSK data symbols, where d is the distance between the embedded QPSK data symbols and t is the length of the payload section.

6. A method of receiving data on a high-order modulation transmission link, comprising:
receiving data symbols; and
decoding the received data symbols, by decoding first data symbols encoded according to a multilevel coding scheme and an M-level Quadrature Amplitude Modulation (M-QAM) or M-level Phase Shift Keying (M-PSK) signal constellation, with M>4, the multilevel coding scheme providing a respective component code for each bit of the first data symbols, at least two of the component codes being different from each other, and decoding Quadrature Phase Shift Keying (QPSK) data symbols encoded according to the multilevel coding scheme and a QPSK signal constellation, wherein the bits of the QPSK data symbols are assigned to corresponding bits of the first data symbols, wherein the QPSK data symbols are embedded between the first data symbols at predefined positions, thereby forming bit sequences including the bits of the QPSK data symbols interposed between the corresponding bits of the first data symbols, and wherein the bit sequences including the QPSK data symbols are decoded by component decoders of the corresponding bits of the first data symbols.

7. The method according to claim 6, wherein said receiving comprises receiving the data symbols within a payload section and also receiving control information for decoding the data symbols, wherein said decoding comprises decoding the data symbols according to a multilevel coding scheme and a high-order signal constellation indicated by the control information, and wherein said decoding includes assigning a weight to the QPSK data symbols that is larger than a weight assigned to the first data symbols.

8. The method according to claim 6, wherein said receiving comprises receiving the data symbols within a payload section and also receiving control information for decoding the data symbols, wherein said decoding comprises decoding the data symbols according to a multilevel coding scheme and a high-order signal constellation indicated by the control information, and wherein said decoding comprises decoding the data symbols using a first stage and a second stage of a decoding process, wherein the first stage includes calculating a reliability value for decoded bits of the first data symbols and setting a predefined reliability value for decoded bits of the QPSK data symbols, and wherein the reliability values are used in the second stage.

9. A method of transmitting data on a high-order modulation transmission link, comprising:
encoding first data symbols according to a multilevel coding scheme and an M-level Quadrature Amplitude Modulation (M-QAM) or M-level Phase Shift Keying (M-PSK) signal constellation with M>4, the multilevel coding scheme providing a respective component code for each bit of the first data symbols, at least two of the component codes being different from each other; and
encoding Quadrature Phase Shift Keying (QPSK) data symbols encoded according to the multilevel coding scheme and a QPSK signal constellation,
wherein bits of the QPSK data symbols are assigned to corresponding bits of the first data symbols;
wherein the QPSK data symbols are embedded between the first data symbols at predefined positions, thereby forming bit sequences including the bits of the QPSK data symbols interposed between the corresponding bits of the first data symbols;
wherein the bit sequences including the bits of the QPSK data symbols are encoded by the component codes of the corresponding bits of the first data symbols; and
transmitting the encoded data symbols.

10. A communication equipment for sending data on a high-order modulation transmission link, comprising:
a control device configured to select, on the basis of parameters of the transmission link, a multilevel coding scheme and an high-order modulation signal constellation for encoding data symbols, the multilevel coding scheme providing a respective component code for each bit of the data symbols, at least two of the component codes being different from each other and the component codes each defining a corresponding code frame length;
a first transmitter function configured to transmit control information with respect to the selected multilevel coding scheme and high-order modulation signal constellation,
an adaptable multilevel encoder configured to encode data symbols according to the selected multilevel coding scheme and high-order modulation signal constellation; and
a second transmitter function configured to transmit a payload section including the encoded data symbols, the length of the payload section being selected on the basis of the code frame lengths in such a way that the end of the payload section coincides with the ends of code frames of each component code.

11. The communication equipment according to claim 10, wherein the payload section consists exclusively of data symbols encoded according to the selected multilevel coding scheme and high-order modulation signal constellation; and wherein the length of the payload section is selected to correspond to an integer multiple of the code frame lengths.

12. The communication equipment according to claim 11, wherein the length of the payload section is selected to correspond to the least common multiple of the code frame lengths.

13. The communication equipment according to claim 10,
wherein the payload section consists of first data symbols encoded according to the selected multilevel coding scheme and an M-level Quadrature Amplitude Modulation (M-QAM) or M-level Phase Shift Keying (M-PSK) signal constellation with M>4 and of Quadrature Phase Shift Keying (QPSK) data symbols encoded according to the selected multilevel coding scheme and a QPSK signal constellation;
wherein bits of the QPSK data symbols are assigned to corresponding bits of the first data symbols;
wherein the QPSK data symbols are embedded at predefined positions between the first data symbols, thereby forming bit sequences including the bits of the QPSK data symbols interposed between the corresponding bits of the first data symbols; and wherein the bit sequences including the bits of the QPSK data symbols are encoded by the component codes of the corresponding bits of the first data symbols.

14. The communication equipment to claim 13,
wherein the QPSK data symbols are embedded at equal distances; and
wherein the length of the payload section is selected to meet the following conditions:
the length of the payload section corresponds to an integer multiple of the code frame lengths defined by the component codes of the corresponding bits of the first data symbols and of the QPSK data symbols, and
a parameter defined by $$\frac{td}{d+1}$$

corresponds to an integer multiple of the code frame lengths defined by the component codes of non-corresponding bits of the first data symbols and of the QPSK data symbols, where d is the distance between the embedded QPSK data symbols and t is the length of the payload section.

15. A communication equipment for receiving data on a high-order modulation transmission link, comprising:
a first receiver function configured to receive control information with respect to a multilevel coding scheme and high-order modulation signal constellation for encoding data symbols, the multilevel coding scheme providing a respective component code for each bit of the data symbols, at least two of the component codes being different from each other and the component codes each defining a corresponding code frame length;
a second receiver function configured to receive a payload section including data symbols encoded according to the multilevel coding scheme and high-order modulation signal constellation, the length of the payload section being selected on the basis of the code frame lengths in such a way that the end of the payload section coincides with the ends of code frames of each component code; and
an adaptable multilevel decoder configured to decode data symbols of the payload section according to the multilevel coding scheme and the high-order modulation signal constellation as defined in the control information received by the first receiver function.

16. A communication equipment for sending data on a high-order modulation transmission link, comprising:
a multilevel encoder configured to encode first data symbols according to a multilevel coding scheme and an M-level Quadrature Amplitude Modulation (M-QAM) or M-level Phase Shift Keying (M-PSK) signal constellation with M>4, the multilevel coding scheme providing a respective component code for each bit of the first data symbols, at least two of the component codes being different from each other, and to encode Quadrature Phase Shift Keying (QPSK) data symbols according to the multilevel coding scheme and a QPSK signal constellation, wherein the bits of the QPSK data symbols are assigned to corresponding bits of the first data symbols, wherein the QPSK data symbols are embedded between the first data symbols at predefined positions, thereby forming bit sequences including the bits of the QPSK data symbols interposed between the corresponding bits of the first data symbols, wherein the multilevel encoder comprises a respective component encoder for each of the component codes, and wherein the bit sequences including the QPSK data symbols are encoded by the component encoders of the corresponding bits of the first data symbols; and
a transmitter configured to transmit the encoded data symbols.

17. A communication equipment for receiving data on a high-order modulation transmission link, comprising:
a receiver configured to receive data symbols; and
a multilevel decoder configured to decode the received data symbols, by decoding first data symbols encoded according to a multilevel coding scheme and an M-level Quadrature Amplitude Modulation (M-QAM) or M-level Phase Shift Keying (M-PSK) signal constellation with M>4, the multilevel coding scheme providing a respective component code for each bit of the first data symbols, at least two of the component codes being different from each other, and by decoding Quadrature Phase Shift Keying (QPSK) data symbols encoded according to the multilevel coding scheme and a QPSK signal constellation, wherein the bits of the QPSK data symbols are assigned to corresponding bits of the first data symbols, wherein the QPSK data symbols are embedded between the first data symbols at predefined positions, thereby forming bit sequences including the bits of the QPSK data symbols interposed between the corresponding bits of the first data symbols, wherein the multilevel decoder comprises a respective component decoder for each of the component codes, and wherein the bit sequences including the QPSK data symbols are decoded by the component decoders of the corresponding bits of the first data symbols.

18. The communication equipment according to claim 17, wherein the receiver is configured to receive the data symbols within a payload section and to receive control information for decoding the data symbols, and wherein the multilevel decoder is configured to decode the data symbols according to a multilevel coding scheme and a high-order signal constellation indicated by the control information, and to assign a weight to the QPSK data symbols that is larger than a weight assigned to the first data symbols.

19. The communication equipment according to claim 17, wherein the receiver is configured to receive the data symbols within a payload section and to receive control information for decoding the data symbols, and wherein the multilevel decoder is configured to decode the data symbols according to a multilevel coding scheme and a high-order signal constellation indicated by the control information, and to decode the data symbols using a first stage and a second stage of a decoding process, wherein the first stage includes calculating a reliability value for decoded bits of the first data symbols and setting a predefined reliability value for decoded bits of the QPSK data symbols, and wherein the reliability values are used in the second stage.

* * * * *

UNITED STATES PATENT AND TRADEMARK OFFICE
CERTIFICATE OF CORRECTION

PATENT NO. : 8,891,661 B2  
APPLICATION NO. : 13/126011  
DATED : November 18, 2014  
INVENTOR(S) : Seier et al.

Page 1 of 1

It is certified that error appears in the above-identified patent and that said Letters Patent is hereby corrected as shown below:

In the drawings

In Fig. 1, Sheet 1 of 13, delete " 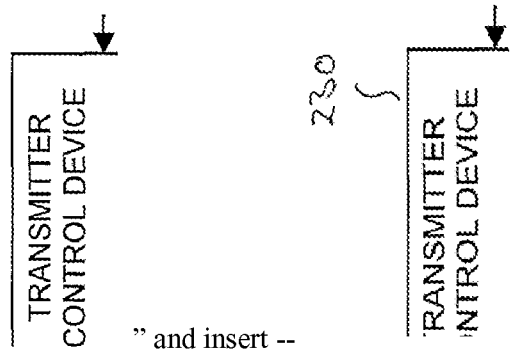 " and insert -- -- , therefor.

In the specification

In Column 2, Line 26, delete "QSPK" and insert -- QPSK --, therefor.

In Column 4, below Line 63, insert Heading -- DETAILED DESCRIPTION --.

In Column 12, Line 41, delete "comprise" and insert -- comprises --, therefor.

In Column 18, Line 55, delete "soft out decoder 323F" and insert -- hard out decoder 323F --, therefor.

In the claims

In Column 20, Line 24, in Claim 1, delete "constellation," and insert -- constellation;" --, therefor.

In Column 22, Lines 29-30, in Claim 10, delete "constellation," and insert -- constellation;" --, therefor.

Signed and Sealed this  
Seventeenth Day of November, 2015

Michelle K. Lee  
*Director of the United States Patent and Trademark Office*